US012783913B2

(12) United States Patent
Bahulkar et al.

(10) Patent No.: US 12,783,913 B2
(45) Date of Patent: Nov. 3, 2026

(54) THERMAL RUNTIME PREDICTION FOR ELECTRONIC DEVICES

(71) Applicant: Snap Inc., Santa Monica, CA (US)

(72) Inventors: Tejas Bahulkar, Sunnyvale, CA (US); Dunxu Hu, Venice, CA (US); Yizhou Ma, Los Angeles, CA (US); Jonah Hephzibah Okike, Los Angeles, CA (US); John James Robertson, Los Angeles, CA (US); Kai Zhou, Wiener Neudorf (AT); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 408 days.

(21) Appl. No.: 18/526,811

(22) Filed: Dec. 1, 2023

(65) Prior Publication Data

US 2025/0181934 A1 Jun. 5, 2025

(51) Int. Cl.
*G06N 5/02* (2023.01)
*G06N 5/022* (2023.01)

(52) U.S. Cl.
CPC .................................... *G06N 5/022* (2013.01)

(58) Field of Classification Search
CPC ...................................................... G06N 5/022
See application file for complete search history.

(56) References Cited

U.S. PATENT DOCUMENTS 1,115,928 A 11/1914 Hansen
4,125,894 A 11/1978 Cashel et al.
(Continued)

FOREIGN PATENT DOCUMENTS

AU 667737 B2 4/1996
AU 739822 B2 10/2001
(Continued)

OTHER PUBLICATIONS

"U.S. Appl. No. 17/661,001, Non Final Office Action mailed Jan. 17, 2024", 26 pgs.
(Continued)

*Primary Examiner* — Zahid Choudhury
(74) *Attorney, Agent, or Firm* — Schwegman Lundberg & Woessner, P.A.

(57) ABSTRACT

A method and system for predicting remaining thermal runtime in an electronic device is disclosed. The method involves obtaining the device's current processor power consumption and temperature sensor reading, selecting a predefined function relating temperature and time at that power level, determining the position of the current temperature on the function, calculating the time position for a shutdown temperature, and determining the time difference to estimate remaining runtime. In some examples, the functions are quadratic curves fitted to empirical time-temperature data collected at different processor power levels. In one embodiment, the prediction is implemented in augmented reality glasses and continuously adjusted using updated power and temperature data. The runtime prediction enables the device to warn the user prior to shutdown and perform graceful shutdown procedures. By accounting for diverse operating conditions, the method provides an accurate estimate of remaining time before the device reaches critical temperatures.

21 Claims, 7 Drawing Sheets

(56) References Cited

U.S. PATENT DOCUMENTS

| | | | | |
|---|---|---|---|---|
| 4,144,573 | A | 3/1979 | Trussell et al. | |
| 4,145,746 | A | 3/1979 | Trussell et al. | |
| 4,180,326 | A | 12/1979 | Chang | |
| 4,267,730 | A | 5/1981 | Curchod et al. | |
| 4,285,240 | A | 8/1981 | Gold | |
| 4,333,337 | A | 6/1982 | Marten | |
| 4,338,818 | A | 7/1982 | Hill et al. | |
| 4,369,660 | A | 1/1983 | Lentz et al. | |
| 4,394,742 | A | 7/1983 | Crummer et al. | |
| 4,402,200 | A | 9/1983 | Clifford et al. | |
| 4,402,222 | A | 9/1983 | Olson et al. | |
| 4,423,379 | A | 12/1983 | Jacobs et al. | |
| 4,507,964 | A | 4/1985 | Borner et al. | |
| 4,512,220 | A | 4/1985 | Barnhill et al. | |
| 4,523,844 | A | 6/1985 | Titsworth et al. | |
| RE31,971 | E | 8/1985 | Gold | |
| 4,578,755 | A | 3/1986 | Quinn et al. | |
| 4,600,827 | A | 7/1986 | Linwood et al. | |
| 4,643,030 | A | 2/1987 | Becker et al. | |
| 4,713,617 | A | 12/1987 | Michalski | |
| 4,761,749 | A | 8/1988 | Titsworth et al. | |
| 4,800,378 | A | 1/1989 | Putrow et al. | |
| 4,804,921 | A | 2/1989 | Putrow et al. | |
| 4,812,768 | A | 3/1989 | Quinn | |
| 4,849,744 | A | 7/1989 | Putrow et al. | |
| 4,851,833 | A | 7/1989 | Putrow et al. | |
| 4,931,964 | A | 6/1990 | Titsworth et al. | |
| 4,980,845 | A | 12/1990 | Putrow et al. | |
| 4,982,612 | A | 1/1991 | Rittmann | |
| 5,220,399 | A | 6/1993 | Christian et al. | |
| 5,245,324 | A | 9/1993 | Jonker et al. | |
| 5,247,287 | A | 9/1993 | Jonker et al. | |
| 5,258,753 | A | 11/1993 | Jonker et al. | |
| 5,296,869 | A | 3/1994 | Jonker et al. | |
| 5,307,279 | A | 4/1994 | Christian et al. | |
| 5,317,903 | A | 6/1994 | Mcclelland et al. | |
| 5,426,371 | A | 6/1995 | Salley et al. | |
| 5,535,522 | A | 7/1996 | Jackson | |
| 5,574,645 | A | 11/1996 | Meeker et al. | |
| 5,677,632 | A | 10/1997 | Meeker | |
| 5,784,284 | A | 7/1998 | Taraki | |
| 5,898,108 | A | 4/1999 | Mieczkowski et al. | |
| 6,018,245 | A | 1/2000 | Villa et al. | |
| 6,148,528 | A | 11/2000 | Jackson | |
| 6,360,273 | B1 | 3/2002 | Beurket et al. | |
| 6,442,661 | B1 | 8/2002 | Dreszer | |
| 6,560,516 | B1 | 5/2003 | Baird et al. | |
| 6,651,098 | B1 | 11/2003 | Carroll et al. | |
| 6,720,860 | B1 | 4/2004 | Narayanaswami | |
| 6,745,286 | B2 | 6/2004 | Staub et al. | |
| 6,816,885 | B1 | 11/2004 | Raghunandan | |
| 6,862,692 | B2 | 3/2005 | Ulrich et al. | |
| 6,873,902 | B2 | 3/2005 | Welch | |
| 6,990,547 | B2 | 1/2006 | Ulrich et al. | |
| 6,990,667 | B2 | 1/2006 | Ulrich et al. | |
| 7,032,116 | B2 * | 4/2006 | Cooper .................. | G06F 1/206 713/320 |
| 7,054,927 | B2 | 5/2006 | Ulrich et al. | |
| 7,209,850 | B2 | 4/2007 | Brott et al. | |
| 7,215,130 | B2 | 5/2007 | Thibedeau et al. | |
| 7,225,064 | B2 | 5/2007 | Fudali et al. | |
| 7,286,927 | B2 | 10/2007 | Decarlo et al. | |
| 7,359,990 | B2 | 4/2008 | Munir et al. | |
| 7,373,226 | B1 | 5/2008 | Cancilla et al. | |
| 7,551,993 | B1 | 6/2009 | Cancilla et al. | |
| 7,565,844 | B2 | 7/2009 | Crass et al. | |
| 7,644,616 | B1 | 1/2010 | Cullum et al. | |
| 7,657,386 | B2 | 2/2010 | Thibedeau et al. | |
| 7,684,026 | B2 | 3/2010 | Rogers et al. | |
| 7,703,213 | B2 | 4/2010 | Rogers | |
| 7,729,880 | B1 | 6/2010 | Mashburn | |
| 7,843,167 | B2 | 11/2010 | Derome et al. | |
| 7,957,860 | B2 | 6/2011 | Grier et al. | |
| 7,971,156 | B2 | 6/2011 | Albertson et al. | |
| 8,104,185 | B2 | 1/2012 | Gray et al. | |
| 8,528,050 | B2 | 9/2013 | Kashima et al. | |
| 8,560,168 | B2 | 10/2013 | Krzystofczyk et al. | |
| 8,588,431 | B2 | 11/2013 | Aggarwal et al. | |
| 8,656,062 | B2 | 2/2014 | Krzystofczyk et al. | |
| 8,693,286 | B1 | 4/2014 | Rogers et al. | |
| 8,819,812 | B1 | 8/2014 | Weber et al. | |
| 9,228,819 | B2 | 1/2016 | Pruitt et al. | |
| 9,242,356 | B2 | 1/2016 | King et al. | |
| 9,285,872 | B1 | 3/2016 | Raffle et al. | |
| 9,477,950 | B2 | 10/2016 | Johnson et al. | |
| 9,542,267 | B2 * | 1/2017 | Nabhane ............. | G06F 11/1048 |
| 9,634,966 | B2 | 4/2017 | Bostick et al. | |
| 9,742,997 | B1 | 8/2017 | Bamberger et al. | |
| 9,747,573 | B2 | 8/2017 | Shaburov et al. | |
| 9,811,923 | B2 | 11/2017 | Wang et al. | |
| 9,911,073 | B1 | 3/2018 | Spiegel et al. | |
| 10,062,050 | B2 | 8/2018 | Lipsey et al. | |
| 10,102,423 | B2 | 10/2018 | Shaburov et al. | |
| 10,127,290 | B1 | 11/2018 | Armstrong et al. | |
| 10,164,975 | B1 | 12/2018 | Son et al. | |
| 10,198,671 | B1 | 2/2019 | Yang et al. | |
| 10,204,137 | B2 | 2/2019 | Shim et al. | |
| 10,212,356 | B1 | 2/2019 | Lerner | |
| 10,219,110 | B2 | 2/2019 | Davis et al. | |
| 10,284,777 | B2 | 5/2019 | Rogers et al. | |
| 10,285,001 | B2 | 5/2019 | Allen et al. | |
| 10,311,644 | B2 | 6/2019 | Rodriguez, II | |
| 10,324,942 | B2 | 6/2019 | Yang et al. | |
| 10,345,987 | B1 | 7/2019 | Andreou | |
| 10,346,985 | B1 | 7/2019 | Poliakov | |
| 10,387,514 | B1 | 8/2019 | Yang et al. | |
| 10,397,469 | B1 | 8/2019 | Yan et al. | |
| 10,410,028 | B1 | 9/2019 | Cansizoglu et al. | |
| 10,417,258 | B2 | 9/2019 | Ogievetsky et al. | |
| 10,427,266 | B2 | 10/2019 | Greenwald et al. | |
| 10,445,938 | B1 | 10/2019 | Poliakov et al. | |
| 10,448,199 | B1 | 10/2019 | Chen et al. | |
| 10,467,147 | B1 | 11/2019 | Ahmed et al. | |
| 10,474,321 | B2 | 11/2019 | Patel et al. | |
| 10,508,907 | B2 | 12/2019 | Rogers et al. | |
| 10,552,968 | B1 | 2/2020 | Wang et al. | |
| 10,572,270 | B1 | 2/2020 | Sampath et al. | |
| 10,582,277 | B2 | 3/2020 | Tang | |
| 10,586,570 | B2 | 3/2020 | Shaburova et al. | |
| 10,592,839 | B2 | 3/2020 | Behringer et al. | |
| 10,607,053 | B1 | 3/2020 | Boyd et al. | |
| 10,664,873 | B1 | 5/2020 | Son et al. | |
| 10,678,849 | B1 | 6/2020 | Ouimet et al. | |
| 10,679,389 | B2 | 6/2020 | Allen et al. | |
| 10,679,428 | B1 | 6/2020 | Chen et al. | |
| 10,685,507 | B2 | 6/2020 | Merg et al. | |
| 10,692,241 | B2 | 6/2020 | Kunert et al. | |
| 10,726,059 | B1 | 7/2020 | Ren et al. | |
| 10,726,872 | B1 | 7/2020 | Boyd et al. | |
| 10,735,890 | B1 | 8/2020 | Akhoondi et al. | |
| 10,740,974 | B1 | 8/2020 | Cowburn et al. | |
| 10,762,121 | B2 | 9/2020 | Denton et al. | |
| 10,764,053 | B2 | 9/2020 | Brook et al. | |
| 10,764,514 | B1 | 9/2020 | Hoevenaar et al. | |
| 10,776,993 | B1 | 9/2020 | Chen et al. | |
| 10,778,884 | B2 | 9/2020 | Yan et al. | |
| 10,803,664 | B2 | 10/2020 | McPhee et al. | |
| 10,805,254 | B1 | 10/2020 | Allen et al. | |
| 10,809,304 | B1 | 10/2020 | Larson et al. | |
| 10,817,898 | B2 | 10/2020 | Waldron et al. | |
| 10,818,308 | B1 | 10/2020 | Chu | |
| 10,823,553 | B1 | 11/2020 | Ruther et al. | |
| 10,836,020 | B2 | 11/2020 | King et al. | |
| 10,861,170 | B1 | 12/2020 | Li et al. | |
| 10,885,559 | B1 | 1/2021 | Andreou | |
| 10,896,346 | B1 | 1/2021 | Gusarov | |
| 10,904,484 | B1 | 1/2021 | Eirinberg et al. | |
| 10,915,924 | B1 | 2/2021 | Soloff | |
| 10,939,236 | B1 | 3/2021 | Fung et al. | |
| 10,943,393 | B2 | 3/2021 | Eastham et al. | |
| 10,944,730 | B1 | 3/2021 | Boutros et al. | |
| 10,962,809 | B1 | 3/2021 | Castañeda | |
| 10,972,984 | B1 | 4/2021 | Tham et al. | |
| 10,993,069 | B2 | 4/2021 | Son et al. | |

(56) References Cited

U.S. PATENT DOCUMENTS 10,997,787 B2 5/2021 Ge et al.
11,003,997 B1 5/2021 Blackwood et al.
11,017,233 B2 5/2021 Charlton et al.
11,023,496 B1 6/2021 Chklovski et al.
11,023,514 B2 6/2021 Allen et al.
11,024,058 B2 6/2021 Rehfeld et al.
11,024,101 B1 6/2021 Chepizhenko et al.
11,030,793 B2 6/2021 Katz
11,032,670 B1 6/2021 Baylin et al.
11,039,113 B2 6/2021 Katz
11,039,394 B2 6/2021 Tham et al.
11,055,514 B1 7/2021 Cao et al.
11,081,141 B2 8/2021 Li et al.
11,087,513 B1 8/2021 Duan et al.
11,087,728 B1 8/2021 Canberk et al.
11,089,427 B1 8/2021 Canberk et al.
11,092,998 B1 8/2021 Castañeda et al.
11,099,643 B1 8/2021 Miller et al.
11,106,343 B1 8/2021 Duan et al.
11,107,185 B2 8/2021 Duan et al.
11,112,945 B1 9/2021 Al Majid et al.
11,115,928 B2 9/2021 Bamberger et al.
11,120,597 B2 9/2021 Cao et al.
11,126,206 B2 9/2021 Meisenholder et al.
11,126,266 B1 9/2021 Xiao et al.
11,126,440 B1 * 9/2021 Rajendran ............. G06F 9/4406
11,132,763 B2 9/2021 Katz et al.
11,140,515 B1 10/2021 Voss et al.
11,143,867 B2 10/2021 Rodriguez, II
11,144,780 B2 10/2021 Hoevenaar
11,146,763 B1 10/2021 Katz
11,157,076 B1 10/2021 Tham
11,157,320 B2 * 10/2021 Boutnaru ................ G06F 11/30
11,158,351 B1 10/2021 Ren et al.
11,159,743 B2 10/2021 Li et al.
11,164,353 B2 11/2021 Luo et al.
11,165,734 B1 11/2021 Desserrey et al.
11,169,600 B1 11/2021 Canberk et al.
11,169,658 B2 11/2021 Al Majid et al.
11,169,675 B1 11/2021 Anvaripour et al.
11,170,393 B1 11/2021 Ma et al.
11,171,908 B1 11/2021 Barton et al.
11,176,723 B2 11/2021 Krishnan Gorumkonda et al.
11,178,089 B1 11/2021 Voss
11,178,375 B1 11/2021 Katz et al.
11,182,603 B1 11/2021 Li et al.
11,189,098 B2 11/2021 Hare et al.
11,190,534 B1 11/2021 Shah et al.
11,195,341 B1 12/2021 Canberk et al.
11,204,949 B1 12/2021 Brewer et al.
11,210,467 B1 12/2021 Carvalho et al.
11,210,850 B2 12/2021 Goodrich et al.
11,212,509 B2 12/2021 Ardisana, II et al.
11,216,949 B1 1/2022 Poliakov
11,217,020 B2 1/2022 Goodrich et al.
11,217,022 B1 1/2022 Woodford
11,218,834 B2 1/2022 Akhoondi et al.
11,218,838 B2 1/2022 Al Majid et al.
11,429,093 B2 * 8/2022 Gustlin .............. H05K 7/20836
11,709,522 B1 * 7/2023 Turullols .................. G06F 1/08 713/340
11,756,274 B1 9/2023 Arya et al.
12,136,160 B2 11/2024 Bahulkar et al.
12,211,158 B2 1/2025 Arya et al.
12,284,195 B1 * 4/2025 Luttwak .............. H04L 63/1416
12,554,847 B1 * 2/2026 Lande Blau .......... G06F 21/554
12,555,339 B2 2/2026 Arya et al.
2002/0004694 A1 1/2002 Mcleod et al.
2002/0124137 A1 9/2002 Ulrich et al.
2002/0138559 A1 9/2002 Ulrich et al.
2002/0169827 A1 11/2002 Ulrich et al.
2002/0191311 A1 12/2002 Ulrich et al.
2005/0005463 A1 1/2005 Omahony et al.
2005/0065678 A1 3/2005 Smith et al.
2005/0248357 A1 11/2005 Mcqueeney et al.
2006/0095230 A1 5/2006 Grier et al.
2006/0142907 A1 6/2006 Cancilla et al.
2006/0287785 A1 12/2006 Decarlo et al.
2007/0083303 A1 4/2007 Osullivan et al.
2007/0227237 A1 10/2007 Brott et al.
2008/0215693 A1 9/2008 Bostick et al.
2009/0030558 A1 1/2009 Rogers et al.
2009/0073425 A1 3/2009 Kling, III et al.
2009/0112506 A1 4/2009 Kazama
2009/0259865 A1 10/2009 Sheynblat et al.
2010/0174928 A1 7/2010 Borghetti et al.
2012/0044527 A1 2/2012 Panko
2012/0158859 A1 6/2012 Saxena et al.
2012/0159221 A1 6/2012 Guddeti et al.
2012/0189264 A1 7/2012 Okazaki et al.
2012/0249741 A1 10/2012 Maciocci et al.
2012/0254634 A1 10/2012 Chakra et al.
2013/0249947 A1 9/2013 Reitan
2014/0053099 A1 2/2014 Groten
2014/0059365 A1 2/2014 Heo et al.
2014/0118257 A1 5/2014 Baldwin
2014/0184620 A1 * 7/2014 Mondjak ................ G09G 5/363 345/520
2015/0066781 A1 3/2015 Johnson et al.
2015/0066901 A1 3/2015 Burris et al.
2015/0066916 A1 3/2015 Burris et al.
2015/0121114 A1 * 4/2015 Muralidhar ............... G06F 1/28 713/340
2015/0205644 A1 7/2015 Ito
2015/0241885 A1 * 8/2015 Shelnutt .................. G06F 1/206 700/299
2015/0277528 A1 10/2015 Knight et al.
2015/0286858 A1 10/2015 Shaburov et al.
2016/0004569 A1 1/2016 Kim et al.
2016/0048869 A1 2/2016 Shim et al.
2016/0091945 A1 * 3/2016 Shabbir ................... G06F 1/206 713/300
2016/0094814 A1 3/2016 Gousev et al.
2016/0162012 A1 6/2016 Chang et al.
2017/0013195 A1 1/2017 Meier et al.
2017/0140581 A1 5/2017 Rogers et al.
2017/0169617 A1 6/2017 Rodriguez, II
2017/0286752 A1 10/2017 Gusarov et al.
2017/0287006 A1 10/2017 Azmoodeh et al.
2017/0289234 A1 10/2017 Andreou et al.
2018/0047222 A1 2/2018 Lewis et al.
2018/0074575 A1 3/2018 Link, Ii
2018/0075651 A1 3/2018 Hare et al.
2018/0075672 A1 3/2018 Lewis et al.
2018/0124300 A1 5/2018 Brook
2018/0174221 A1 6/2018 Merg et al.
2018/0225687 A1 8/2018 Ahmed et al.
2018/0267839 A1 9/2018 Maisuria et al.
2018/0293771 A1 10/2018 Piemonte et al.
2018/0308287 A1 10/2018 Daniels et al.
2018/0357614 A1 12/2018 Merg et al.
2019/0018656 A1 1/2019 Monsarrat
2019/0094966 A1 3/2019 Kulkarni et al.
2019/0146973 A1 5/2019 Merg et al.
2019/0187765 A1 * 6/2019 Ashwood ............... H04B 1/385
2019/0206061 A1 7/2019 Kudriashov et al.
2019/0222723 A1 7/2019 Harrell et al.
2019/0279046 A1 9/2019 Han et al.
2019/0319899 A1 10/2019 Dos et al.
2020/0013022 A1 1/2020 Lewis et al.
2020/0019761 A1 1/2020 Kang et al.
2020/0073122 A1 3/2020 Rothkopf et al.
2020/0088515 A1 3/2020 Rogers et al.
2020/0112531 A1 4/2020 Tang
2020/0125467 A1 * 4/2020 Sultenfuss ............ G06F 9/3865
2020/0143238 A1 5/2020 Ramnath et al.
2020/0167995 A1 5/2020 Hare et al.
2020/0219312 A1 7/2020 Jurgenson et al.
2020/0234223 A1 7/2020 Merg et al.
2020/0314586 A1 10/2020 Bouba et al.
2020/0334283 A1 10/2020 Cook et al.
2020/0342389 A1 10/2020 Merg et al.
2020/0351353 A1 11/2020 Al Majid et al.
2020/0356760 A1 11/2020 Li et al.

(56) References Cited

U.S. PATENT DOCUMENTS

2020/0358731 A1 11/2020 Boyd et al.
2020/0379614 A1 12/2020 Al Majid et al.
2020/0380747 A1 12/2020 Canberk et al.
2020/0389466 A1 12/2020 Sankuratripati
2020/0401112 A1* 12/2020 York .................. G05B 19/4155
2020/0401225 A1 12/2020 Jaureguiberry et al.
2020/0401838 A1 12/2020 Gusarov
2020/0402312 A1 12/2020 Gratz et al.
2020/0409457 A1 12/2020 Terrano et al.
2020/0410458 A1 12/2020 Merg et al.
2020/0412864 A1 12/2020 Al Majid et al.
2020/0412975 A1 12/2020 Al Majid et al.
2020/0413030 A1 12/2020 Zak et al.
2020/0413233 A1 12/2020 Cieslak et al.
2021/0003453 A1 1/2021 Ruther et al.
2021/0003454 A1 1/2021 Ruther et al.
2021/0004970 A1 1/2021 Ruther et al.
2021/0006759 A1 1/2021 Monastyrshyn
2021/0027100 A1 1/2021 Bogdanovych et al.
2021/0034202 A1 2/2021 Chand
2021/0049836 A1 2/2021 Covington et al.
2021/0049844 A1 2/2021 Covington
2021/0065448 A1 3/2021 Goodrich et al.
2021/0065454 A1 3/2021 Goodrich et al.
2021/0065464 A1 3/2021 Goodrich et al.
2021/0067756 A1 3/2021 Goodrich et al.
2021/0067836 A1 3/2021 Hornsby et al.
2021/0076173 A1 3/2021 Monroy-Hernandez et al.
2021/0081088 A1 3/2021 Voss
2021/0089522 A1 3/2021 Costantino et al.
2021/0089599 A1 3/2021 Jahangiri et al.
2021/0097245 A1 4/2021 Monroy-Hernández
2021/0097742 A1 4/2021 Krishnan Gorumkonda et al.
2021/0097743 A1 4/2021 Krishnan Gorumkonda et al.
2021/0099551 A1 4/2021 Cieslak et al.
2021/0099639 A1 4/2021 Bartow et al.
2021/0105415 A1 4/2021 Zhang et al.
2021/0109584 A1 4/2021 Guim et al.
2021/0125664 A1 4/2021 Holland et al.
2021/0136521 A1 5/2021 Al Majid et al.
2021/0142586 A1 5/2021 Covington et al.
2021/0158389 A1 5/2021 Andreou
2021/0165998 A1 6/2021 Cao et al.
2021/0173207 A1 6/2021 Bamberger et al.
2021/0173880 A1 6/2021 Cooper et al.
2021/0182331 A1 6/2021 Al Majid et al.
2021/0192744 A1 6/2021 Vij et al.
2021/0200390 A1 7/2021 Luo et al.
2021/0200426 A1 7/2021 Al Majid et al.
2021/0201036 A1 7/2021 Gupta et al.
2021/0201392 A1 7/2021 Aghdaii et al.
2021/0203627 A1 7/2021 Luo et al.
2021/0203628 A1 7/2021 Luo et al.
2021/0203909 A1 7/2021 Ryuma et al.
2021/0209825 A1 7/2021 Assouline et al.
2021/0218821 A1 7/2021 Lonkar et al.
2021/0224050 A1 7/2021 Wang et al.
2021/0235225 A1 7/2021 Strand et al.
2021/0240315 A1 8/2021 Alvi et al.
2021/0241529 A1 8/2021 Cowburn et al.
2021/0247729 A1 8/2021 Merg et al.
2021/0255763 A1 8/2021 Robertson et al.
2021/0258511 A1 8/2021 Goodrich et al.
2021/0264949 A1 8/2021 Huang
2021/0279155 A1 9/2021 Theriot et al.
2021/0279842 A1 9/2021 Anilkumar et al.
2021/0281632 A1 9/2021 Brewer et al.
2021/0297811 A1 9/2021 Meisenholder et al.
2021/0299630 A1 9/2021 Kozhemiak et al.
2021/0303077 A1 9/2021 Anvaripour et al.
2021/0303110 A1 9/2021 Giacalone et al.
2021/0303114 A1 9/2021 Apanovych et al.
2021/0303855 A1 9/2021 Anvaripour et al.
2021/0303860 A1 9/2021 Anvaripour et al.
2021/0304429 A1 9/2021 Cowburn et al.
2021/0304449 A1 9/2021 Mourkogiannis
2021/0304451 A1 9/2021 Fortier et al.
2021/0304505 A1 9/2021 Anvaripour et al.
2021/0304506 A1 9/2021 Mourkogiannis et al.
2021/0304507 A1 9/2021 Smith et al.
2021/0304629 A1 9/2021 Barron et al.
2021/0304754 A1 9/2021 Fortier et al.
2021/0306451 A1 9/2021 Heikkinen et al.
2021/0306839 A1 9/2021 Baron et al.
2021/0312523 A1 10/2021 Luo et al.
2021/0312533 A1 10/2021 Luo et al.
2021/0312672 A1 10/2021 Luo et al.
2021/0312678 A1 10/2021 Luo et al.
2021/0312690 A1 10/2021 Krishnan Gorumkonda et al.
2021/0319540 A1 10/2021 Cao et al.
2021/0319586 A1 10/2021 Rogers et al.
2021/0319612 A1 10/2021 Monroy-Hernandez et al.
2021/0328955 A1 10/2021 Collins et al.
2021/0334993 A1 10/2021 Woodford
2021/0335350 A1 10/2021 Ribas Machado Das Neves et al.
2021/0336909 A1 10/2021 Taitz
2021/0337351 A1 10/2021 Tham et al.
2021/0352262 A1 11/2021 Buslaev et al.
2021/0357075 A1 11/2021 Nayar et al.
2021/0365309 A1 11/2021 Merg
2021/0367798 A1 11/2021 Giacalone et al.
2021/0367914 A1 11/2021 Collins et al.
2021/0374839 A1 12/2021 Luo et al.
2021/0382585 A1 12/2021 Collins et al.
2021/0382587 A1 12/2021 Heikkinen et al.
2021/0382616 A1 12/2021 Gale et al.
2021/0383373 A1 12/2021 Eirinberg et al.
2021/0383509 A1 12/2021 Demyanov et al.
2021/0385179 A1 12/2021 Heikkinen et al.
2021/0387090 A1 12/2021 Eirinberg et al.
2021/0387097 A1 12/2021 Desserrey et al.
2021/0387099 A1 12/2021 Desserrey et al.
2021/0387637 A1 12/2021 Rogers et al.
2021/0389851 A1 12/2021 Al Majid et al.
2021/0389852 A1 12/2021 Desserrey et al.
2021/0390118 A1 12/2021 Gorkin et al.
2021/0390729 A1 12/2021 Fox-roberts et al.
2021/0390745 A1 12/2021 Rykhliuk et al.
2021/0390784 A1 12/2021 Smith et al.
2021/0390843 A1 12/2021 Schrebe et al.
2021/0392096 A1 12/2021 Desserrey et al.
2021/0392098 A1 12/2021 Gorkin et al.
2021/0392459 A1 12/2021 Gorkin et al.
2021/0392460 A1 12/2021 Gorkin et al.
2021/0397000 A1 12/2021 Rodriguez, II
2021/0400442 A1 12/2021 Cieslak et al.
2021/0404831 A1 12/2021 Drummond et al.
2021/0405363 A1 12/2021 Canberk et al.
2021/0405747 A1 12/2021 Tham
2021/0405831 A1 12/2021 Mourkogiannis et al.
2021/0405832 A1 12/2021 Brown et al.
2021/0406447 A1 12/2021 Hermann et al.
2021/0406543 A1 12/2021 Drummond et al.
2021/0406585 A1 12/2021 Hoevenaar
2021/0406965 A1 12/2021 Anvaripour et al.
2021/0407163 A1 12/2021 Chai et al.
2021/0407178 A1 12/2021 Zhou et al.
2021/0407205 A1 12/2021 Canberk et al.
2021/0407506 A1 12/2021 Drummond et al.
2021/0407548 A1 12/2021 Ren et al.
2021/0409356 A1 12/2021 Luo et al.
2021/0409357 A1 12/2021 Brody et al.
2021/0409502 A1 12/2021 Chepizhenko et al.
2021/0409517 A1 12/2021 Luo et al.
2021/0409535 A1 12/2021 Mourkogiannis et al.
2021/0409610 A1 12/2021 Mandia et al.
2021/0409612 A1 12/2021 Mandia et al.
2021/0409614 A1 12/2021 Luo et al.
2021/0409616 A1 12/2021 Chan et al.
2021/0409898 A1 12/2021 Fung et al.
2021/0409904 A1 12/2021 Baylin et al.
2022/0004260 A1 1/2022 Xiao et al.
2022/0059159 A1 2/2022 Holland et al.
2022/0114318 A1 4/2022 Gallina et al.

(56) References Cited

U.S. PATENT DOCUMENTS

| | | | |
|---|---|---|---|
| 2022/0121288 | A1 | 4/2022 | Wu et al. |
| 2022/0124242 | A1 | 4/2022 | Gruhlke et al. |
| 2022/0365348 | A1 | 11/2022 | Hanumante et al. |
| 2022/0373401 | A1* | 11/2022 | Ashwood ................. G01K 1/20 |
| 2022/0413938 | A1* | 12/2022 | Iyer ..................... G06F 11/3433 |
| 2023/0054237 | A1 | 2/2023 | Liu |
| 2023/0351666 | A1 | 11/2023 | Bahulkar et al. |
| 2024/0013493 | A1 | 1/2024 | Arya et al. |
| 2024/0345895 | A1 | 10/2024 | Bahulkar et al. |
| 2025/0022206 | A1 | 1/2025 | Bahulkar et al. |
| 2025/0044848 | A1* | 2/2025 | Devaraj .................. G06F 1/189 |
| 2025/0118037 | A1 | 4/2025 | Arya et al. |
| 2025/0118041 | A1 | 4/2025 | Gueye |
| 2025/0123675 | A1* | 4/2025 | Kirubakaran ........... G06F 1/329 |
| 2025/0181934 | A1* | 6/2025 | Bahulkar ............ G06F 11/3062 |
| 2026/0104748 | A1* | 4/2026 | Ogras ....................... G06F 1/26 |

FOREIGN PATENT DOCUMENTS

| | | | |
|---|---|---|---|
| AU | 2009255971 | A1 | 12/2009 |
| CA | 1246223 | A | 12/1988 |
| CA | 1304162 | C | 6/1992 |
| CA | 1307050 | C | 9/1992 |
| CA | 2239912 | C | 2/2000 |
| CA | 2100545 | C | 1/2002 |
| CA | 2166673 | C | 4/2004 |
| CA | 2642852 | A1 | 10/2007 |
| CA | 2849522 | A1 | 11/2014 |
| CN | 110624 | C | 6/2003 |
| CN | 1427945 | A | 7/2003 |
| CN | 1511230 | A | 7/2004 |
| CN | 1522340 | A | 8/2004 |
| CN | 1533496 | A | 9/2004 |
| CN | 1187715 | C | 2/2005 |
| CN | 1189861 | C | 2/2005 |
| CN | 1592842 | A | 3/2005 |
| CN | 1695063 | A | 11/2005 |
| CN | 1708678 | A | 12/2005 |
| CN | 1255665 | C | 5/2006 |
| CN | 1265207 | C | 7/2006 |
| CN | 1306246 | C | 3/2007 |
| CN | 101095029 | A | 12/2007 |
| CN | 100360893 | C | 1/2008 |
| CN | 100360897 | C | 1/2008 |
| CN | 100538257 | C | 9/2009 |
| CN | 100565100 | C | 12/2009 |
| CN | 100565154 | C | 12/2009 |
| CN | 1742193 | B | 4/2010 |
| CN | 101802547 | A | 8/2010 |
| CN | 101809404 | B | 6/2012 |
| CN | 103217129 | A | 7/2013 |
| CN | 103226010 | A | 7/2013 |
| CN | 103453857 | A | 12/2013 |
| CN | 104025159 | A | 9/2014 |
| CN | 104139365 | A | 11/2014 |
| CN | 102177524 | B | 4/2015 |
| CN | 102369560 | B | 4/2015 |
| CN | 105209853 | A | 12/2015 |
| CN | 102803017 | B | 4/2016 |
| CN | 205483598 | U | 8/2016 |
| CN | 104142204 | B | 1/2017 |
| CN | 106408237 | A | 2/2017 |
| CN | 104488004 | B | 4/2017 |
| CN | 104487207 | B | 5/2017 |
| CN | 107110647 | A | 8/2017 |
| CN | 107111428 | A | 8/2017 |
| CN | 107124532 | A | 9/2017 |
| CN | 107273415 | A | 10/2017 |
| CN | 107278317 | A | 10/2017 |
| CN | 107430697 | A | 12/2017 |
| CN | 107637072 | A | 1/2018 |
| CN | 107710772 | A | 2/2018 |
| CN | 107924494 | A | 4/2018 |
| CN | 108140148 | A | 6/2018 |
| CN | 108351988 | A | 7/2018 |
| CN | 108351989 | A | 7/2018 |
| CN | 108351997 | A | 7/2018 |
| CN | 104142903 | B | 9/2018 |
| CN | 104937557 | B | 11/2018 |
| CN | 108798273 | A | 11/2018 |
| CN | 108832799 | A | 11/2018 |
| CN | 108942767 | A | 12/2018 |
| CN | 109314659 | A | 2/2019 |
| CN | 109416805 | A | 3/2019 |
| CN | 109716264 | A | 5/2019 |
| CN | 109791346 | A | 5/2019 |
| CN | 109791404 | A | 5/2019 |
| CN | 109791635 | A | 5/2019 |
| CN | 109791650 | A | 5/2019 |
| CN | 109791668 | A | 5/2019 |
| CN | 105593880 | B | 6/2019 |
| CN | 109844761 | A | 6/2019 |
| CN | 109863532 | A | 6/2019 |
| CN | 109952610 | A | 6/2019 |
| CN | 105683970 | B | 7/2019 |
| CN | 109997129 | A | 7/2019 |
| CN | 110050283 | A | 7/2019 |
| CN | 110089117 | A | 8/2019 |
| CN | 110168476 | A | 8/2019 |
| CN | 110168478 | A | 8/2019 |
| CN | 110168586 | A | 8/2019 |
| CN | 110192395 | A | 8/2019 |
| CN | 108351988 | B | 9/2019 |
| CN | 110199245 | A | 9/2019 |
| CN | 110268437 | A | 9/2019 |
| CN | 110300951 | A | 10/2019 |
| CN | 110383344 | A | 10/2019 |
| CN | 110383579 | A | 10/2019 |
| CN | 110394758 | A | 11/2019 |
| CN | 110462616 | A | 11/2019 |
| CN | 110800012 | A | 2/2020 |
| CN | 111386547 | A | 7/2020 |
| CN | 111630550 | A | 9/2020 |
| CN | 111771156 | A | 10/2020 |
| CN | 107111434 | B | 11/2020 |
| CN | 112335148 | A | 2/2021 |
| CN | 112771438 | A | 5/2021 |
| CN | 112771856 | A | 5/2021 |
| CN | 109699186 | B | 6/2021 |
| CN | 113168425 | A | 7/2021 |
| CN | 113260951 | A | 8/2021 |
| CN | 105358934 | B | 9/2021 |
| CN | 113544682 | A | 10/2021 |
| CN | 113631886 | A | 11/2021 |
| CN | 113825091 | A | 12/2021 |
| CN | 113874757 | A | 12/2021 |
| CN | 113874813 | A | 12/2021 |
| CN | 113875161 | A | 12/2021 |
| CN | 113906413 | A | 1/2022 |
| CN | 119096215 | A | 12/2024 |
| CN | 119522408 | A | 2/2025 |
| CN | 120917400 | | 11/2025 |
| DE | 4300112 | C2 | 12/1998 |
| DE | 60313810 | T2 | 6/2007 |
| DE | 69814132 | T3 | 7/2007 |
| EP | 0762135 | A2 | 3/1997 |
| EP | 0789457 | A2 | 8/1997 |
| EP | 1071930 | A1 | 1/2001 |
| EP | 0724159 | B1 | 8/2001 |
| EP | 0701134 | B1 | 12/2001 |
| EP | 0927335 | B1 | 4/2003 |
| EP | 1307701 | A2 | 5/2003 |
| EP | 0789244 | B1 | 4/2004 |
| EP | 1481254 | A1 | 12/2004 |
| EP | 1620700 | A2 | 2/2006 |
| EP | 1783570 | A1 | 5/2007 |
| EP | 1958311 | A2 | 8/2008 |
| EP | 2179249 | A1 | 4/2010 |
| EP | 2174201 | B1 | 2/2013 |
| EP | 2841876 | A1 | 3/2015 |
| EP | 1573671 | B1 | 9/2016 |
| EP | 2965167 | B1 | 7/2018 |
| EP | 2171418 | B1 | 1/2020 |
| EP | 3507772 | B1 | 12/2020 |

(56) References Cited

FOREIGN PATENT DOCUMENTS

| | | | |
|---|---|---|---|
| EP | 3420474 | B1 | 4/2021 |
| EP | 3871198 | A1 | 9/2021 |
| EP | 3899917 | A1 | 10/2021 |
| EP | 3903500 | A1 | 11/2021 |
| EP | 3909029 | A1 | 11/2021 |
| ES | 2317267 | T3 | 4/2009 |
| GB | 2508099 | A | 5/2014 |
| GB | 2528741 | A | 2/2016 |
| GB | 2587491 | A | 3/2021 |
| HU | 217933 | B | 5/2000 |
| KR | 20150092226 | | 8/2015 |
| KR | 20190119115 | A | 10/2019 |
| KR | 20190125520 | A | 11/2019 |
| KR | 20190139311 | A | 12/2019 |
| KR | 20200043462 | A | 4/2020 |
| KR | 20210008939 | A | 1/2021 |
| KR | 20210025690 | A | 3/2021 |
| KR | 20210046760 | A | 4/2021 |
| KR | 20210103541 | A | 8/2021 |
| KR | 20210107139 | A | 8/2021 |
| KR | 20210116652 | A | 9/2021 |
| TW | 587349 | B | 5/2004 |
| TW | 200416115 | A | 9/2004 |
| TW | I626750 | B | 6/2018 |
| TW | I637381 | B | 10/2018 |
| WO | WO-007304 | A9 | 11/2001 |
| WO | WO-02061737 | A2 | 8/2002 |
| WO | WO-2005033628 | A2 | 4/2005 |
| WO | WO-2012067832 | A1 | 5/2012 |
| WO | WO-2012082807 | A2 | 6/2012 |
| WO | WO-2015030737 | A1 | 3/2015 |
| WO | 2017044341 | | 3/2017 |
| WO | 2018175138 | | 9/2018 |
| WO | 2019046797 | | 3/2019 |
| WO | WO-2020047261 | A1 | 3/2020 |
| WO | WO-2020051086 | A1 | 3/2020 |
| WO | WO-2020132541 | A1 | 6/2020 |
| WO | WO-2020160261 | A1 | 8/2020 |
| WO | 2020246985 | | 12/2020 |
| WO | WO-2021042134 | A1 | 3/2021 |
| WO | WO-2021051131 | A1 | 3/2021 |
| WO | WO-2021061326 | A1 | 4/2021 |
| WO | WO-2021062439 | A1 | 4/2021 |
| WO | WO-2021067988 | A1 | 4/2021 |
| WO | WO-2021119408 | A1 | 6/2021 |
| WO | WO-2021119662 | A1 | 6/2021 |
| WO | WO-2021138630 | A1 | 7/2021 |
| WO | WO-2021189068 | A1 | 9/2021 |
| WO | WO-2021194755 | A1 | 9/2021 |
| WO | WO-2021194855 | A1 | 9/2021 |
| WO | WO-2021195192 | A1 | 9/2021 |
| WO | WO-2021195404 | A1 | 9/2021 |
| WO | WO-2021203118 | A1 | 10/2021 |
| WO | WO-2021203119 | A1 | 10/2021 |
| WO | WO-2021203133 | A1 | 10/2021 |
| WO | WO-2021212133 | A1 | 10/2021 |
| WO | WO-2021216999 | A1 | 10/2021 |
| WO | WO-2021222107 | A1 | 11/2021 |
| WO | WO-2021222225 | A1 | 11/2021 |
| WO | WO-2021226341 | A1 | 11/2021 |
| WO | WO-2021242634 | A1 | 12/2021 |
| WO | WO-2021242688 | A1 | 12/2021 |
| WO | WO-2021242771 | A1 | 12/2021 |
| WO | WO-2021247362 | A1 | 12/2021 |
| WO | WO-2021252201 | A2 | 12/2021 |
| WO | WO-2021252242 | A2 | 12/2021 |
| WO | WO-2021252386 | A1 | 12/2021 |
| WO | WO-2021252763 | A1 | 12/2021 |
| WO | WO-2021257280 | A1 | 12/2021 |
| WO | WO-2021257401 | A1 | 12/2021 |
| WO | WO-2021257450 | A1 | 12/2021 |
| WO | WO-2021257455 | A1 | 12/2021 |
| WO | WO-2021257616 | A1 | 12/2021 |
| WO | WO-2021257619 | A1 | 12/2021 |
| WO | WO-2021263208 | A1 | 12/2021 |
| WO | WO-2021263210 | A1 | 12/2021 |
| WO | WO-2022005687 | A1 | 1/2022 |
| WO | WO-2022005693 | A1 | 1/2022 |
| WO | WO-2022005698 | A1 | 1/2022 |
| WO | WO-2022005708 | A1 | 1/2022 |
| WO | WO-2022005715 | A1 | 1/2022 |
| WO | WO-2022005717 | A1 | 1/2022 |
| WO | WO-2022005720 | A1 | 1/2022 |
| WO | WO-2022005726 | A1 | 1/2022 |
| WO | WO-2022005733 | A1 | 1/2022 |
| WO | WO-2022005734 | A1 | 1/2022 |
| WO | WO-2022005794 | A1 | 1/2022 |
| WO | WO-2022005838 | A1 | 1/2022 |
| WO | WO-2022005841 | A1 | 1/2022 |
| WO | WO-2022005843 | A1 | 1/2022 |
| WO | WO-2022005845 | A1 | 1/2022 |
| WO | WO-2022005946 | A1 | 1/2022 |
| WO | WO-2022006116 | A1 | 1/2022 |
| WO | WO-2022006138 | A1 | 1/2022 |
| WO | WO-2022006162 | A1 | 1/2022 |
| WO | WO-2022006170 | A1 | 1/2022 |
| WO | WO-2022006249 | A1 | 1/2022 |
| WO | WO-2022006279 | A1 | 1/2022 |
| WO | WO-2022006289 | A1 | 1/2022 |
| WO | WO-2022006299 | A1 | 1/2022 |
| WO | WO-2022006318 | A1 | 1/2022 |
| WO | WO-2022271606 | A1 | 12/2022 |
| WO | WO-2023211739 | A1 | 11/2023 |
| WO | WO-2024011175 | A1 | 1/2024 |
| WO | WO-2024215615 | A1 | 10/2024 |
| WO | WO-2025117372 | A1 | 6/2025 |

OTHER PUBLICATIONS

"U.S. Appl. No. 17/661,001, Notice of Allowance mailed May 14, 2024", 14 pgs.
"U.S. Appl. No. 17/661,001, Notice of Allowance mailed Jun. 28, 2024", 8 pgs.
"U.S. Appl. No. 17/661,001, Response filed Mar. 21, 2024 to Non Final Office Action mailed Jan. 17, 2024", 9 pgs.
"U.S. Appl. No. 17/859,588, Non Final Office Action mailed Mar. 2, 2023", 16 pgs.
"U.S. Appl. No. 17/859,588, Notice of Allowance mailed Apr. 27, 2023", 9 pgs.
"U.S. Appl. No. 17/859,588, Response filed Apr. 4, 2023 to Non Final Office Action mailed Mar. 2, 2023", 12 pgs.
"U.S. Appl. No. 18/360,945, Non Final Office Action mailed Jun. 21, 2024", 16 pgs.
"U.S. Appl. No. 18/360,945, Notice of Allowance mailed Sep. 27, 2024", 9 pgs.
"U.S. Appl. No. 18/360,945, Response filed Sep. 20, 2024 to Non Final Office Action mailed Jun. 21, 2024", 12 pgs.
"U.S. Appl. No. 18/987,940, Non Final Office Action mailed Aug. 22, 2025", 13 pgs.
"U.S. Appl. No. 18/987,940, Response filed Aug. 27, 2025 to Non Final Office Action mailed Aug. 22, 2025", 10 pgs.
"European Application Serial No. 23726659.8, Response to Communication pursuant to Rules 161 and 162 EPC filed Jun. 3, 2025", 13 pgs.
"International Application Serial No. PCT/US2023/019128, International Preliminary Report on Patentability mailed Nov. 7, 2024", 8 pgs.
"International Application Serial No. PCT/US2023/019128, International Search Report mailed Aug. 29, 2023", 2 pgs.
"International Application Serial No. PCT/US2023/019128, Written Opinion mailed Aug. 29, 2023", 6 pgs.
"International Application Serial No. PCT/US2023/069708, International Preliminary Report on Patentability mailed Jan. 16, 2025", 12 pgs.
"International Application Serial No. PCT/US2023/069708, International Search Report mailed Dec. 12, 2023", 5 pgs.
"International Application Serial No. PCT/US2023/069708, Invitation to Pay Additional Fees mailed Oct. 18, 2023", 11 pgs.
"International Application Serial No. PCT/US2023/069708, Written Opinion mailed Dec. 12, 2023", 11 pgs.

(56) References Cited

OTHER PUBLICATIONS

"International Application Serial No. PCT/US2024/023595, International Search Report mailed Jul. 9, 2024", 3 pgs.
"International Application Serial No. PCT/US2024/023595, Written Opinion mailed Jul. 9, 2024", 7 pgs.
"U.S. Appl. No. 18/133,644, Final Office Action mailed Feb. 4, 2026", 15 pgs.
"European Application Serial No. 23748416.7, Communication Pursuant to Article 943 EPC mailed Feb. 25, 2026", 6 pgs.
"U.S. Appl. No. 18/133,644, Response filed Mar. 23, 2026 to Final Office Action mailed Feb. 4, 2026", 9 pgs.
"U.S. Appl. No. 18/133,644, Advisory Action mailed Apr. 1, 2026", 3 pgs.
"U.S. Appl. No. 18/898,084, Notice of Allowance mailed Apr. 17, 2026", 17 pgs.
"U.S. Appl. No. 18/133,644, Notice of Allowance mailed Apr. 21, 2026", 10 pgs.
"XGBoost Documentation", [Online]. Retrieved from the Internet https web.archive. org web 20220126071724 https xgboost.readthedocs. io en latest index.html, Archived on Jan. 26, 2022, 3 pgs.
Sahin, Onur, "On the Impacts of Greedy Thermal Management in Mobile Devices", IEEE Embedded Systems Letters, vol. 7, No. 2, Jun. 2015, 55-58.
"Lens Performance Overlay", Snap for Developers, [Online]. Retrieved from the Internet URL https developers.snap.com spectacles best-practices profiling lens-performance-overlay, Retrieved Sep. 11, 2025, 4 pgs.
"Spectacles Monitor", Snap for Developers, [Online]. Retrieved from the Internet URL https developers.snap.com spectacles best-practices profiling spectacles-monitor, Retrieved Sep. 11, 2025, 6 pgs.
"Spectacles Monitor - Perfetto", Snap for Developers, [Online]. Retrieved from the Internet URL https developers.snap.com spectacles best-practices profiling spectacles-monitor#perfetto, Retrieved Sep. 11, 2025, 3 pgs.
"Performance Head-Up Display", Meta Horizon OS Developers, [Online]. Retrieved from the Internet URL https developers.meta. com horizon documentation native pc dg-hud , Retrieved Sep. 11, 2025, 10 pgs.
"Analyzing the performance of your visionOS app", Apple Developer Documentation, [Online]. Retrieved from the Internet URL https developer.apple.com documentation visionOS analyzing-the-performance-of-your-visionOS-app, Retrieved Sep. 11, 2025, 12 pgs.
"What exactly are YouTube TV Stats for Nerds and why do they matter?", Youtube Help, [Online]. Retrieved from the Internet URL https support.google.com youtube thread 241010806 what-exactly-are-youtube-tv-stats-for-nerds-and-why-do-they-matter?hl=en, Oct. 26, 2023, 4 pgs.
"flightlessmango MangoHud", [Online]. Retrieved from the Internet URL https github.com flightlessmango MangoHud, Retrieved Sep. 11, 2025, 14 pgs.
"epezent implot", [Online]. Retrieved from the Internet URL https github.com epezent implot, Retrieved Sep. 11, 2025, 9 pgs.
"European Application Serial No. 23748416.7, Response to Communication pursuant to Rules 161 and 162 EPC filed Aug. 8, 2025", 11 pgs.
"U.S. Appl. No. 18/133,644, Non Final Office Action mailed Oct. 1, 2025", 12 pgs.
"International Application Serial No. PCT US2018 022083, International Preliminary Report on Patentability mailed Oct. 3, 2019", 13 pgs.
"U.S. Appl. No. 18/987,940, Notice of Allowance mailed Oct. 20, 2025", 11 pgs.
"International Application Serial No. PCT US2024 023595, International Preliminary Report on Patentability mailed Oct. 23, 2025", 8 pgs.
"U.S. Appl. No. 18/133,644, Response filed Dec. 31, 2025 to Non Final Office Action mailed Oct. 1, 2025", 8 pgs.
"International Application Serial No. PCT US2024 057088, International Search Report mailed Feb. 28, 2025", 5 pgs.
"International Application Serial No. PCT US2024 057088, Written Opinion mailed Feb. 28, 2025", 7 pgs.
"U.S. Appl. No. 18/898,084, Notice of Allowance mailed May 12, 2026", 8 pgs.
"International Application Serial No. PCT US2024 057088, International Preliminary Report on Patentability mailed Jun. 11, 2026", 9 pgs.
"European Application Serial No. 24721850.6, Response to Communication pursuant to Rules 1611 and 162 EPC filed Apr. 29, 2026", 18 pgs.
"European Application Serial No. 23748416.7, Response filed Jun. 23, 2026 to Communication Pursuant to Article 943 EPC mailed Feb. 25, 2026", 16 pgs.
"U.S. Appl. No. 18/133,644, Amendment Under 37 CFR 1.312 Filed Jul. 20, 2026", 6 pgs.
"Korean Application Serial No. 10-2024-7039459, Notice of Preliminary Rejection mailed Jun. 30, 2026", W English Translation, 12 pgs.
"Korean Application Serial No. 10-2025-7004053, Notice of Preliminary Rejection mailed May 26, 2026", w English Translation, 14 pgs.

* cited by examiner

THERMAL RUNTIME PREDICTION FOR ELECTRONIC DEVICES

BACKGROUND

Electronic devices such as augmented reality glasses, mobile phones, and wearable devices can generate significant heat during operation. Components such as central processing units (CPUs), graphic processing units (GPUs), screens, surface-mount devices (SMDs), Systems-on-a-Chip (SOCs), sensors, and transmitters can raise the internal temperature of the device. If the temperature exceeds safe limits, the device may overheat, experience performance throttling, or even unexpected shutdown.

Predicting the remaining operating time before a device reaches a critical shutdown temperature is challenging. The temperature profile can depend on variable factors like the processing load, screen brightness, ambient temperature, and airflow. Accurately estimating the thermal characteristics under diverse operating conditions requires monitoring many parameters.

Prior techniques rely on simple thresholds and fail to account for interaction between components. This leads to premature throttling or unexpected shutdowns. More sophisticated fluid dynamics simulations are computationally intensive.

BRIEF SUMMARY

The present disclosure relates to predicting the remaining thermal runtime of an electronic device before it reaches thermal shutdown. An example electronic device may include an augmented reality (AR) viewing device, such as AR glasses. In some examples, the electronic device includes an on-device logger to periodically log temperature sensor readings and power consumption of components, such as SOCs. A core assumption is that at a constant power level, the temperature will increase or decrease monotonically until it stabilizes.

Some disclosed examples herein predict temperature change based on power consumption. The prediction uses one or more predefined functions such as fitted quadratic curves or other polynomial functions for temperature over time at different power levels. Examples pick a curve based on current power, find the time to reach shutdown temperature, and calculate remaining runtime. In some examples, prediction accuracy increases as the device approaches a shutdown temperature.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
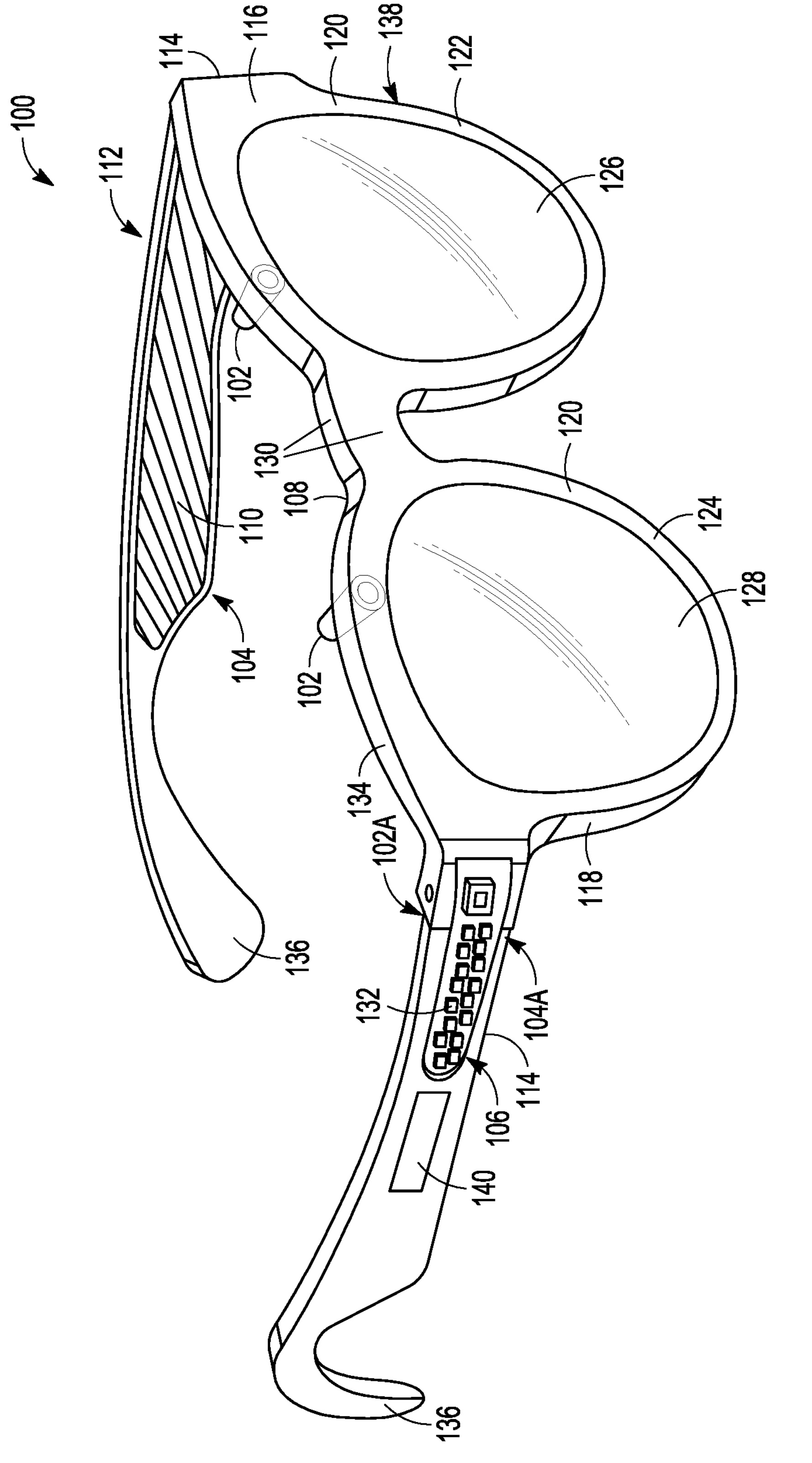
FIG. 1 illustrates an example electronic device, according to an example embodiment.

As mentioned above, electronic devices such as augmented reality glasses, mobile phones, and wearable devices can generate significant heat during operation. Components such as central processing units (CPUs), graphic processing units (GPUs), screens, surface-mount devices (SMDs), Systems-on-a-Chip (SOCs), sensors, and transmitters can raise the internal temperature of the device. If the temperature exceeds safe limits, the device may overheat, experience performance throttling, or even unexpected shutdown.

In seeking to address these and other challenges, some examples incorporate an efficient runtime prediction technique that can dynamically estimate when an electronic device will exceed a safe operating temperature, given current conditions. Safe runtime predictions can allow product developers to improve component and circuit designs, including thermal management. In use, accurate runtime predictions can also allow the device to take proactive measures like warning the user, saving state, and gracefully shutting down before an emergency shutdown occurs. In some examples, a thermal runtime prediction accounts for parameters like sensor temperatures, processing loads, power consumption, and ambient temperature. Some examples are conveniently rendered lightweight and compact so as to run continuously on resource-constrained devices, such as the AR glasses described below.

In some examples, a method is provided for predicting a remaining runtime until a shutdown temperature is reached in an electronic device. The method includes obtaining power consumption of a component or processor in the electronic device; obtaining a current temperature reading from a temperature sensor associated with the component or processor; selecting a predefined function representing a relationship between temperature and time at the obtained power consumption; determining coordinates of the current temperature reading on the selected function; determining coordinates of the shutdown temperature on the selected function; and calculating a difference between the time coordinates of the shutdown temperature and the current temperature to determine a predicted remaining runtime until the component or processor reaches the shutdown temperature if power consumption remains constant.

In some examples, the predefined functions include, or are constituted by, quadratic or other polynomial equations fitted to empirical time-temperature data collected at different power consumption levels of the component or processor. The empirical data may be collected by loading the component or processor to desired power levels and recording temperature sensor readings over time. In some examples, the predefined functions include polynomial equations and/or exponential plateau functions.

In some examples, a predicted remaining runtime is continually adjusted based on updated power consumption and temperature readings. Adjustment factors may be applied to earlier predictions to improve accuracy, based on a determination that prediction accuracy increases as the remaining runtime approaches zero.

In some examples, the method is implemented in an augmented reality device comprising a frame, display, and component or processor. Temperature sensors associated with the component or processor provide temperature readings to a runtime prediction module (or on-device logger) implementing the method. The prediction is used to warn a user of imminent shutdown and enable graceful shutdown procedures.

These and other aspects are now described with reference to some specific examples.

FIG. 1 shows a perspective view of a head-wearable user device, in this example shown as an AR eyewear device (e.g., the glasses 100), in accordance with some example embodiments. The form factor of the glasses 100 is compact and space available for internal componentry is tight. The glasses 100, in this instance, can be worn to view augmented or virtual content displayed over real content visible in a content interaction system.

The example glasses 100 of FIG. 1 include a small frame 112 made from any suitable material such as plastic or metal, including any suitable shape memory alloy, as is well known for ophthalmic eyewear. In one or more embodiments, the frame 112 includes a front piece 138, including a first or left (as worn by a user) optical element holder 122 (e.g., a display or lens holder) and a second or right (as worn by a user) optical element holder 124, connected by a nose piece or bridge 130. The front piece 138 additionally includes a left end portion 116 and a right end portion 118. A first or left optical element 126 and a second or right optical element 128 can be provided within respective left optical element holder 122 and right optical element holder 124. Each of the right optical elements 128 and the left optical elements 126 can be a lens, a display, a display assembly, or a combination of the foregoing. Any of the display assemblies disclosed herein can be provided in the glasses 100.

The frame 112 additionally includes a left arm or temple piece 104 and a right arm or temple piece 106 coupled to the respective left end portion 116 and the right end portion 118 of the front piece 138 by any suitable means such as at a folding hinge 144 (one folding hinge 144 on each side), so as to be coupled to the front piece 138, or rigidly or otherwise secured to the front piece 138 so as to be integral with the front piece 138. In one or more implementations, each of the temple pieces 104 and the temple pieces 106 includes a first portion 114 that is coupled to the respective left end portion 116 or right end portion 118 of the front piece 138 and any suitable second portion 136 for coupling to the ear of the user. In one embodiment, the front piece 138 can be formed from a single piece of material, so as to have a unitary or integral construction. In one embodiment, such as illustrated in FIG. 1, the entire frame 112 can be formed from a single piece of material so as to have a unitary or integral construction.

The glasses 100 can include a computing device, such as a computer 132, which can be of any suitable type so as to be carried by the frame 112 and, in one or more embodiments of a suitable size and shape, so as to be at least partially disposed in one of the temple pieces 104 and the temple pieces 106. In one or more embodiments, as illustrated in FIG. 1, the computer 132 is sized and shaped similar to the size and shape of one of the temple pieces 106 (e.g., or the temple piece 104), and is thus disposed almost entirely, if not entirely, within the structure and confines of such temple piece 106. In one or more embodiments, the computer 132 is disposed in both of the temple piece 104 and the temple piece 106 and flexible circuits connecting the two parts of the computer 132 pass through one (or typically both) of the folding hinges 144. The computer 132 can include one or more printed circuit boards (PCBs) and one or more hardware processors with memory, wireless communication circuitry, and a power source. In some examples, the computer 132 comprises low-power circuitry, high-speed circuitry, and a display processor. Various other embodiments may include these elements in different configurations or integrated together in different ways.

The computer 132 additionally includes a battery 110 or other suitable portable power supply. In one embodiment, the battery 110 is disposed in one of the temple pieces 104 or the temple piece 106. In the glasses 100 shown in FIG. 1, the battery 110 is shown as being disposed in left temple piece 104 and electrically coupled using the connection 134 to the remainder of the computer 132 disposed in the right temple piece 106. The glasses 100 can include a connector or port (not shown) suitable for charging the battery 110 accessible from the outside of frame 112, a wireless receiver, transmitter, or transceiver (not shown) or a combination of such devices.

In one or more implementations, the glasses 100 include cameras 102. Although two cameras are depicted, other embodiments contemplate the use of a single or additional (i.e., more than two) cameras. In one or more embodiments, the glasses 100 include any number of input sensors or peripheral devices in addition to the cameras 102. The front piece 138 is provided with an outward facing, forward-facing, or front or outer surface 120 that faces forward or away from the user when the glasses 100 are mounted on the face of the user, and an opposite inward-facing, rearward-facing, or rear or inner surface 108 that faces the face of the user when the glasses 100 are mounted on the face of the user. Such sensors can include inwardly-facing video sensors or digital imaging modules, such as cameras that can be mounted on or provided within the inner surface 108 of the front piece 138 or elsewhere on the frame 112 so as to be facing the user, and outwardly-facing video sensors or digital imaging modules such as the cameras 102 that can be mounted on or provided with the outer surface 120 of the front piece 138 or elsewhere on the frame 112 so as to be facing away from the user.

Such sensors, peripheral devices or peripherals can additionally include biometric sensors, ambient condition sensors, light sensors, temperature sensors, location sensors, power monitors, or any other such sensors. In one or more implementations, the glasses 100 include a track pad 140 or other touch or sensory input device to receive navigational commands from the user. One or more track pads 140 may be provided at convenient locations for user interaction on one or both of the track pad 140 and the temple piece 106.

In some examples, the computer 132 includes a flexible printed circuit board (PCB) or flexible section 146. In some examples, the flexible section 146 is located at or adjacent to the folding hinge 144. More specifically, the flexible section 146 may be located in a region either side of or crossing the (or each) folding hinge 144. The flexible section 146 adjacent a folding hinge 144 may undergo a degree of bending, flexing, or movement when the left and right arms 104 and 106 of the glasses 100 are opened and closed, for example.

Figure 2:
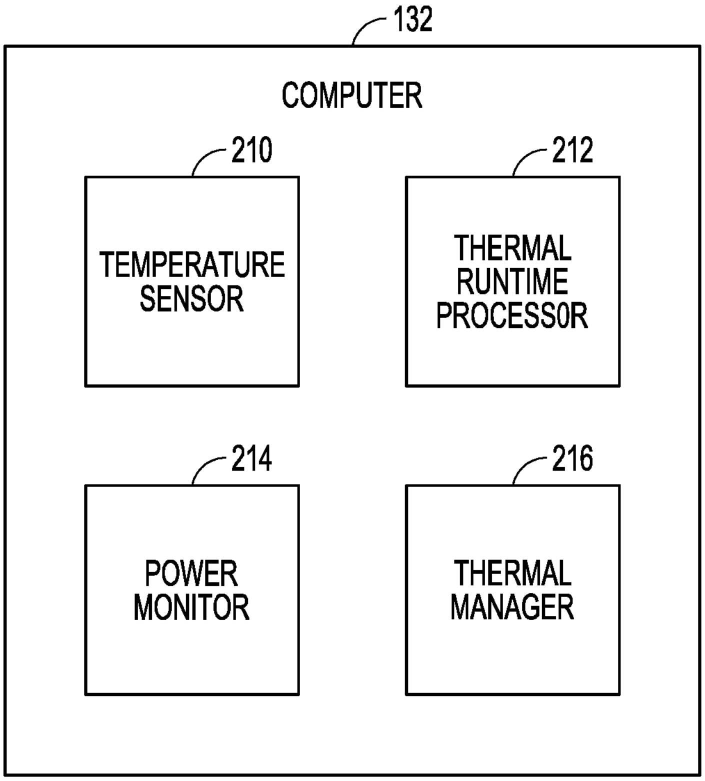
FIG. 2 illustrates examples components for determining or predicting thermal runtimes, according to example embodiments.

With reference to FIG. 2, example components are shown for performing thermal runtime predictions (or making determinations of same) for heat-producing components of an electronic device, such as the glasses 100. In the examples that follow, the heat-producing components will for convenience, but by way of example only, be referred to as SOCs. Other components and/or electronic devices for which thermal runtime predictions can be determined are possible. For example, thermal runtime predictions for heat-producing components such as those described in the Background section further above, or for other electronic devices such as desktop or laptop computer, are possible. In the present example, the thermal runtime prediction components are included in the computer 132 on the glasses 100, but can in some examples communicate with remote components, processors, servers and data bases via access to Application Programming Interfaces (APIs).

In FIG. 2, a temperature sensor 210 measures the current temperature of one or more SOCs implementing on the glasses 100 and provides temperature readings to a thermal runtime processor 212. A power monitor 214 also monitors power consumption of one or more SOCs implementing on the glasses 100 and provides current power usage data to the thermal runtime processor 212.

The thermal runtime processor 212 (also referred to in some examples as an on-device logger herein) logs temperature and power data points from sensors placed on the glasses 100 over time. The sensors may include the temperature sensor 210 and/or the power monitor 214. Other data-providing sensors are possible. In some examples, the power and/or temperature sensors may be remote sensors and may record, log, or transmit data to the thermal runtime processor 212 relating to ambient conditions, such as humidity, temperature, or sunshine present in a more general location of the glasses 100 (or other electronic device), for example a room in which a wearer of the glasses 100 or the electronic device is located or operating.

In some examples, the thermal runtime processor 212 fits predefined functions, such as quadratic curves, and/or polynomial functions or curves, and/or exponential plateau functions, to the collected power and temperature data at different power levels. Some example predefined functions are described further below with reference to FIG. 3A and FIG. 3B. In some general examples, a predefined function includes a predetermined correlation or mathematical function between power and temperature in relation to an operating component. For purposes of making predictions or determinations of thermal runtime of a given component, the predefined function may include, for a given operating power or power supply, a time taken to reach a temperature plateau, but other aspects can be used in some examples.

In a present example, the thermal runtime processor 212 selects an appropriate curve (predefined function) based on current component power consumption as determined by the power monitor 214. The thermal runtime processor 212 predicts a remaining time to reach shutdown temperature based on the selected curve and the current temperature as determined by the temperature sensor 210. In some examples, the thermal runtime processor 212 provides or exposes one or more APIs for other application and service functions of the glasses 100 to access or retrieve predicted runtimes, actual and threshold temperatures, and other data.

Some examples provide a ThermalRuntime API that allows accessing the predicted remaining runtime before thermal shutdown. An example API includes the following:

getPredictedRuntime( )—returns the predicted remaining seconds before reaching shutdown temperature.

getCurrentTemperature( )—returns the current temperature reading from the on-device logger.

getShutdownTemperature( )—returns the shutdown temperature threshold set for the device.

getTemperatureCurve( )—returns the array of (time, temperature) points for the currently selected quadratic temperature curve.

setShutdown Temperature (temperature)—allows setting the shutdown temperature threshold.

addTemperatureListener (listener)—registers a callback listener that will be invoked whenever the predicted remaining runtime changes.

The API uses the underlying predefined function (such as quadratic curve fitting described further below) and selection system to continuously update the predicted runtime. Device applications and service functions use this API to obtain the latest runtime prediction and current temperature, be notified of changes, and configure the shutdown temperature if needed.

Some example usage includes:

```
ThermalRuntime runtime = ThermalRuntime.getInstance( );  //
Print predicted remaining runtime
System.out.println("Remaining runtime: " +
runtime.getPredictedRuntime( ) + " seconds");  // Register
listener for changes
runtime.addTemperatureListener((newRuntime) => {
System.out.println("Runtime changed to: " + newRuntime + "
seconds");  });
```

In some examples, the ThermalRuntime API includes additional methods such as:

getPowerConsumption( )—returns the current power consumption of the SOC(s).

getTemperatureTrend( )—returns a TemperatureTrend object encapsulating the selected quadratic curve.

The TemperatureTrend class provide methods such as:

getCurve( )—returns the array of points fitting the quadratic curve.

getEquation( )—returns the quadratic equation describing the curve.

getPowerRange( )—returns the power range this curve applies to.

Additional usage examples include:

```
// Get current power consumption   double power =
runtime.getPowerConsumption( );
// Get details on current temperature trend   TemperatureTrend
trend = runtime.getTemperatureTrend( );
// Print curve points System.out.println(trend.getCurve( ));  //
Print curve equation System.out.println(trend.getEquation( ));
// Show power range for this curve System.out.println("Power
range: " + trend.getPowerRange( ));
// Set a lower shutdown threshold
runtime.setShutdownTemperature(50);
// Check if runtime is below a threshold if
(runtime.getPredictedRuntime( ) < MIN_SAFE_RUNTIME) {
// Take action to cool down device }
// Get notified when crossing threshold
runtime.addTemperatureListener(runtime -> {   if (runtime <
MIN_SAFE_RUNTIME) {   onOverheating( );   } });
```

In some examples, the API also allows registering custom power or temperature listeners to receive a notification of changes.

In some examples, temperature sensors such as the temperature sensor 208 are located at critical spots on the glasses 100 frame, for example, near heat generating components like CPUs and the battery. The temperature sensor 208 can include thermistors, thermocouples, or integrated circuit temperature sensors. The temperature sensor 208 can provide temperature readings to the thermal runtime processor 212 via an I2C or SPI bus.

In some examples, power monitors such as the power monitor 214 employ shunt resistors to measure current draw of each SOC and calculate power consumption based on current and voltage. In some examples, the power monitor 214 provides power consumption data to the thermal runtime processor 212 via a serial communication bus.

In some examples, the thermal runtime processor 212 is implemented as part of system management controller firmware. In some examples, the thermal runtime processor 212 stores temperature and time data points in an internal memory and runs curve fitting algorithms periodically using accumulated data. In some examples, the thermal runtime processor 212 exposes one or more APIs to applications and services over a universal asynchronous receiver/transmitter (UART) using a lightweight protocol such as JSON.

In some examples, a thermal manager such as the thermal manager 216 is implemented as part of system management controller firmware, and registers for notifications from the thermal runtime processor 212 over UART. In some examples, the thermal manager 216 controls fan speed and/or manages throttling of SOCs to cool the electronic device, such as the glasses 100.

In some examples, the frame 112 of the glasses 100 includes temperature sensor PCBs connected to internal thermistors, shunt resistors on power paths to SOCs to allow current monitoring, UART connections from the thermal runtime processor 212 to an SOC for runtime APIs, and issues or transmits fan and throttling control signals from the thermal runtime processor 212 to the SOC. This compact configuration allows the runtime prediction logic to reside in the management controller firmware while sensors, monitors, and cooling mechanisms are implemented in hardware integrated into the glasses frame.

In some examples, the thermal runtime processor 212 and/or the thermal manager 216 may include one or more processors. A "processor" herein refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

A processor may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

Returning again to FIG. 2, in some examples the thermal runtime components located in the computer 132 of the glasses 100 further comprise a thermal manager 216, mentioned above. The thermal manager 216 listens for predicted runtimes for given SOCs from the thermal runtime processor 212 and takes appropriate action, for example issuing a machine-readable alert to another external or internal component of the glasses 100, or to human-readable alert to a wearer of the glasses 100. In some examples, the thermal manager 216 initiates or coordinates a throttling or cooling action for the monitored SOCs, or other components of the glasses 100. For example, the thermal manager 216 may takes a throttling or cooling action if a predicted runtime drops below configured thresholds.

A general overall system architecture in an electronic device incorporating these components can include temperature sensors and power monitors providing data to a thermal runtime processor. The thermal runtime processor logs data over time, fits curves, selects an appropriate curve, and predicts remaining runtime. In some examples, data logging occurs separately prior to the prediction algorithm, and data may be logged and collected from artificially stressing the device at different loads, rather than in a thermal runtime processor on the fly. This can make generating data at constant power easier. In some examples, data generation is a separate process.

In some examples, device applications and service functions access a thermal runtime API to get a predicted runtime. A thermal manager listens to the thermal runtime processor and takes appropriate action, such as throttling or cooling a component or the device, if needed. A compact system architecture for a constrained volume such as the glasses 100 allows the runtime prediction and curve fitting logic to be encapsulated conveniently in the thermal runtime processor 212, while still providing an API for other components. The compact thermal manager 216 handles taking appropriate actions if the runtime drops too low.

Figure 3A:
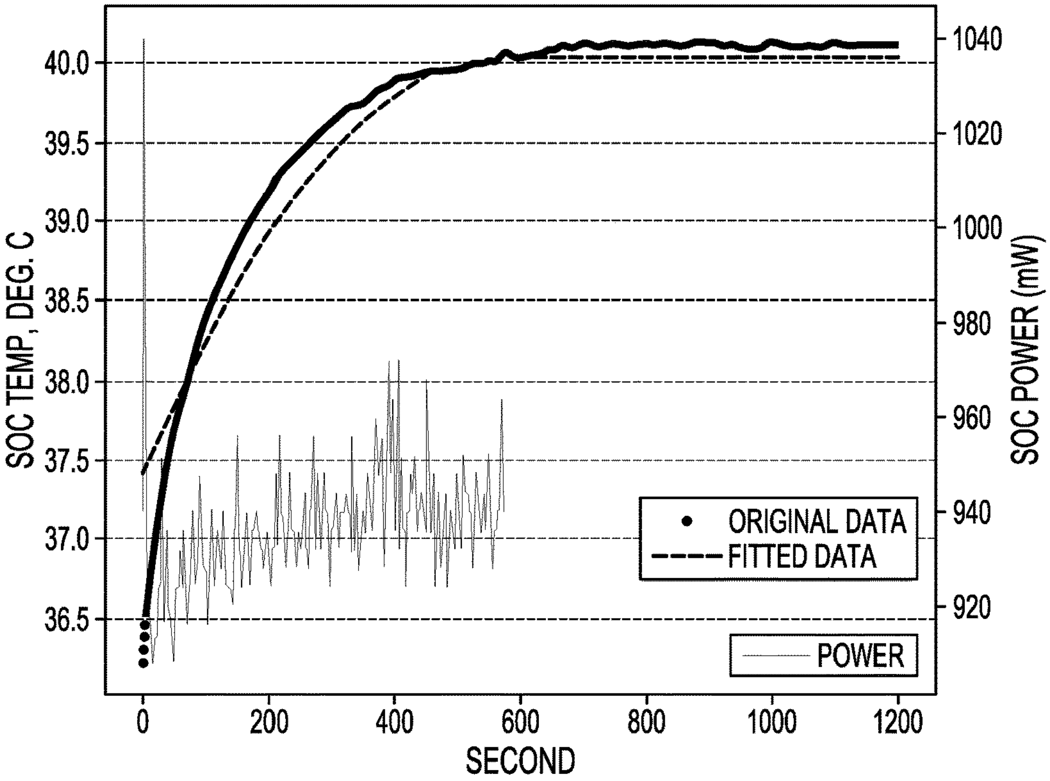
FIG. 3A and FIG. 3B illustrate curves for a predefined function in determining or predicting thermal runtimes, according to example embodiments.
Figure 3B:
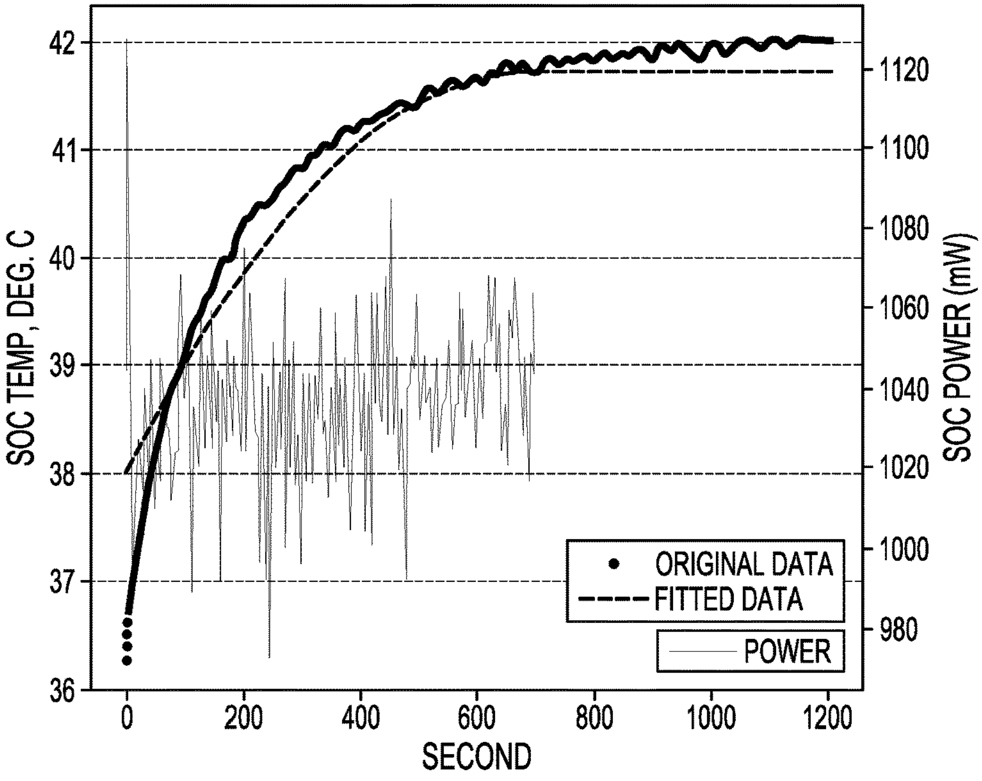

With reference to FIG. 3A and FIG. 3B, some examples herein include methods for deriving time and temperature relationships for use in predefined functions in thermal runtime prediction operations. For example, in one illustrative baseline approach for deriving a time and temperature relationship to establish a predefined function, only one temperature sensor is considered and only SOC power consumption for two comparative SOC components is considered as a factor. A time and temperature relationship at different power levels can be derived by generating controlled data.

In one example, a data generation script loads and runs an SOC in a test electronic device at different power levels and observes a temperature elevation trend over a period of time. From the device, log files containing SOC power consumption and corresponding temperature sensor readings at periodic time intervals, for example every 12 seconds, are obtained. Example curves, such as those illustrated in the graphs of FIG. 3A for 4 silver core CPU running at an average total SOC power of 936 milliwatts (mW) and FIG. 3B for 1 gold core CPU running at an average power of 1034 mW, can be generated for respective temperature elevation trends.

In each graph, the left Y axis indicates SOC temperature in degrees Celsius and the right Y axis indicates SOC power consumption in mW. The X axis depicts time in seconds. Several time and temperature relationships can be derived in this manner over time for different SOC power consumption and temperature elevation trends. The respective curve lines in FIG. 3A and FIG. 3B show original data (i.e. from the log files), fitted data (based on a predefined function), and power consumption levels over time for the indicated temperature and power levels, merely by way of example.

Some examples, for example as shown in the graphs of FIG. 3A and FIG. 3B, indicate that SOC operating temperature typically stabilizes within 20 minutes (1200 seconds), and that the higher the SOC power consumption, the faster the SOC temperature stabilizes. In some examples, for thermal runtime prediction purposes, a quadratic function can provide a “good enough” fit as a predefined function for the period before the SOC reaches an equilibrium or plateau temperature. The fitted data generated by applying the predefined function (for example a quadratic or other function) can be used to predict a thermal runtime for a given SOC (or other component or electronic device in other examples). As may be appreciated, the metric known as R2 is a statistical measure that indicates how well model or fitted date approximates the real data points. The R2 metric can be used to evaluate the accuracy and explanatory power of a fitted regression line, for example. The closer the R2 value is to 1, the more accurate the model. In the present example, the R2 values for the graphs of FIG. 3A and FIG. 3B was approximately 0.94 i.e., close to 1. A predefined function comprising a quadratic function modeling the heating or cooling period and a plateau flat line modeling the equilibrium temperature was therefore considered, at least for this example SOC, to provide acceptable modeling and prediction capabilities, accordingly. In some instances, other predefined functions may be better suited to other types of components and may be generated or selected accordingly.

Figure 4:
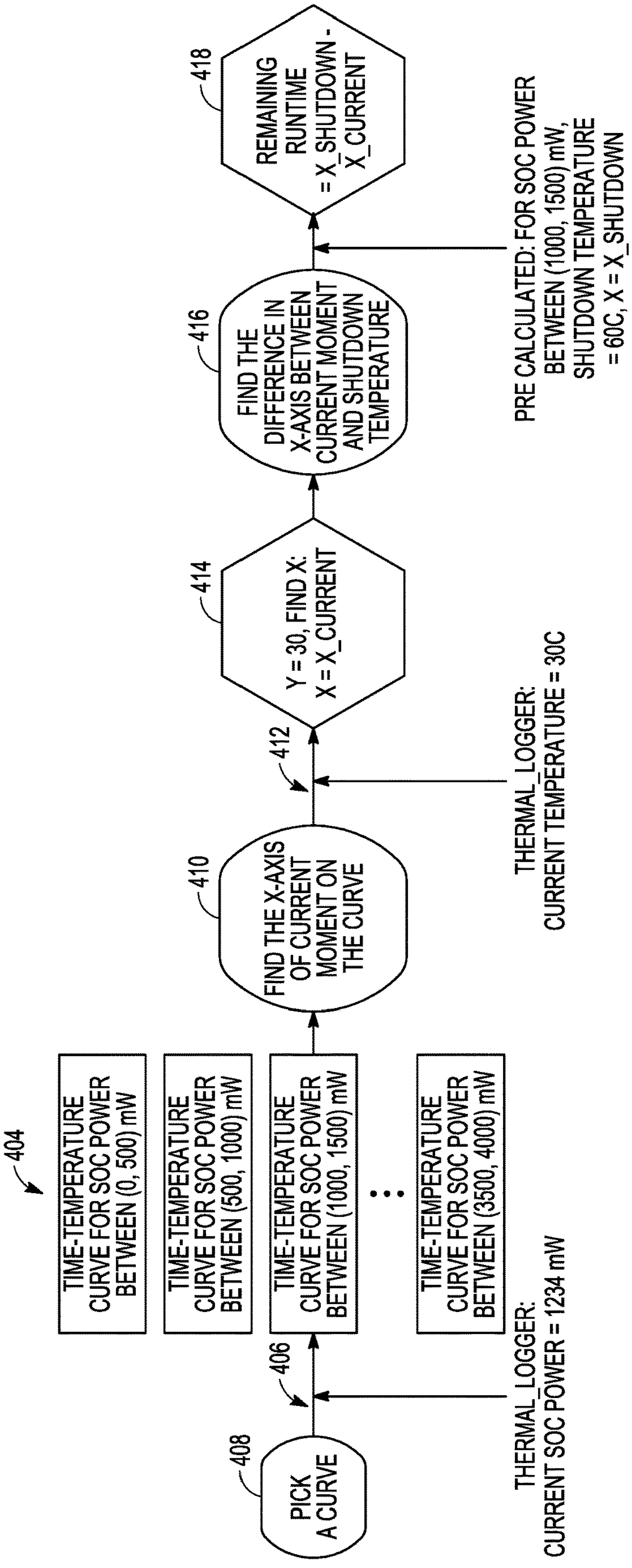
FIG. 4 is a flowchart illustrating example operations in a method for predicting remaining thermal runtime of an electronic device.

With reference to the thermal runtime flow chart of FIG. 4, in operation 404, a set of curves for time-temperature trends at different power levels is obtained or accessed by the thermal runtime processor 212 (on-device logger). A determination may be made as to a sufficiency of the set of curves for a given component, such as an SOC, based on typical power consumption or operating temperature levels of that component. The curve-set sufficiency determination may include checking that the set of curves covers an anticipated or expected range of power consumptions or operating temperature levels of the applicable component in use, for example. The curve-set sufficiency determination may also include selecting a degree of fidelity or increment in power levels between each curve in the curve set, for example a power increment between successive curves in a curve set in the range of 10 mW, or 50 mW, or 100 mW between each curve, for example. Other power curve ranges or increments are possible.

Other factors, such as ambient conditions, may be considered when selecting or establishing the set of curves, for example as described further below. Similarly, the most appropriate or applicable predefined function, such as a quadratic or other function, for generating the fitted data may be established or selected based on similar principles.

Again with reference to FIG. 4, in some examples, the thermal runtime processor 212 performs or coordinates real-time thermal runtime predictions as follows. In operation 406, the power monitor 214 reads a current power consumption of a monitored component (for example, an SOC running at 1234 mW) and transmits this data to the thermal runtime processor 212. In operation 408, the thermal runtime processor 212 determines which curve to use based on the received power reading. In operation 410, the thermal runtime processor 212 finds the X-axis value of the current moment in time on the selected curve. In operation 412, the temperature sensor 208 determines the current component temperature (for example 30 degrees Celsius) and transmits that temperature data to the thermal runtime processor 212. In some examples, the order of operation 410 and operation 412 are reversed. In other words, first the temperature sensor sends current temperature information to the thermal runtime processor, then the thermal runtime processor finds the x-axis value of the current moment.

In operation 414, for a given Y-axis value of 30 degrees Celsius on the selected curve, a corresponding X_current value is determined. In operation 416, given a previously established component shutdown temperature, the thermal runtime processor 212 solves for a remaining X-axis time value using the applicable predefined function and calculates the difference between the X_current time value at the current temperature and the X-axis value at the applicable shutdown temperature to derive or predict a remaining thermal runtime. It may be noted that for predefined functions including a polynomial expression or function having a degree higher than 2, some examples use Newton’s method to approximate a root value instead. In some examples, data logging occurs separately prior to the prediction algorithm, and data may be logged and collected from artificially stressing the device at different loads, rather than in a thermal runtime processor on the fly. This can make generating data at constant power easier. In some examples, data generation is a separate process.

Some examples include software architecture and components that can implement thermal runtime determinations, for example as described herein. Example components include a TemperatureSensor module to get current temperature readings from hardware sensors, a PowerMonitor module to get current power consumption from hardware monitors, a CurveFitting module to fit predfined functions (such as quadratic curves) to past temperature and time data, a CurveSelector module to Selects appropriate curve based on power, a RuntimePredictor module to predicts a remaining runtime on curve, a ThermalManager module to handle thermal management actions if needed. In some examples, data logging occurs separately prior to the prediction algorithm, and data may be logged and collected from artificially stressing the device at different loads, rather than in a thermal runtime processor on the fly. This can make generating data at constant power easier. In some examples, data generation is a separate process.

In an example software architecture, the TemperatureSensor and PowerMonitor modules capture data from hardware. The CurveFitting module periodically fits curves to collected data. The CurveSelector selects an appropriate curve based on current power. The RuntimePredictor uses CurveSelector curves and TemperatureSensor readings to predict a remaining runtime. The ThermalManager registers for runtime predictions and manages thermal operations, if needed. A main control loop calls the TemperatureSensor module, the PowerMonitor module, the RuntimePredictor module, and the ThermalManager module. This allows for modularity with each logical function in its own module. The components interact via function calls and data sharing.

In some examples, the modules are structured in classes with interfaces such as:

```
class TemperatureSensor {getCurrentTemp( ) { }}
class PowerMonitor {getCurrentPower( ) { }}
```

The example software components may perform one or more of the following operations:

1. Start
2. Get current temperature reading from temperature sensor
3. Get current power consumption from power monitor
4. Select quadratic curve based on current power consumption
5. Determine current point on selected curve using current temperature
6. Calculate remaining time to reach shutdown temperature on selected curve
7. Store predicted remaining runtime
8. Check if runtime below threshold
9. If yes, trigger thermal management action
10. If no, return to step 2

End

Figure 5A:
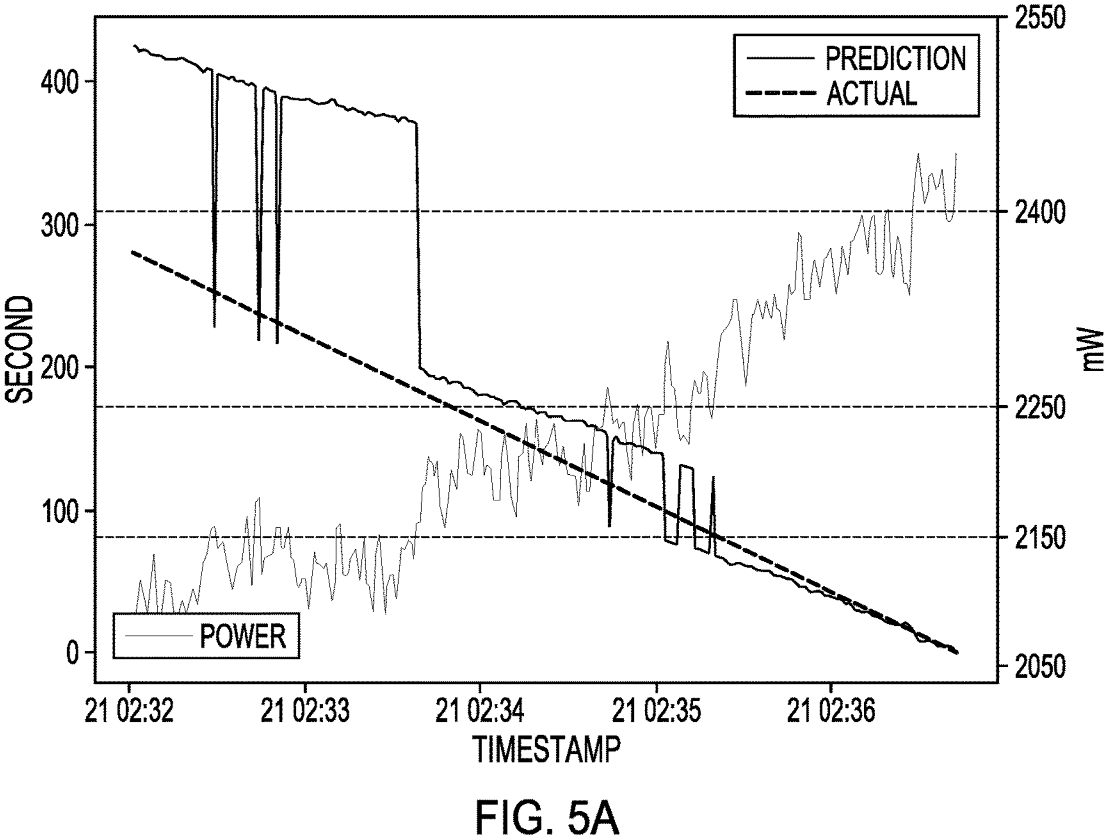
FIG. 5A and FIG. 5B illustrates example curves for a component in an electronic device providing an evaluation of a runtime prediction's accuracy, according to example embodiments.
Figure 5B:
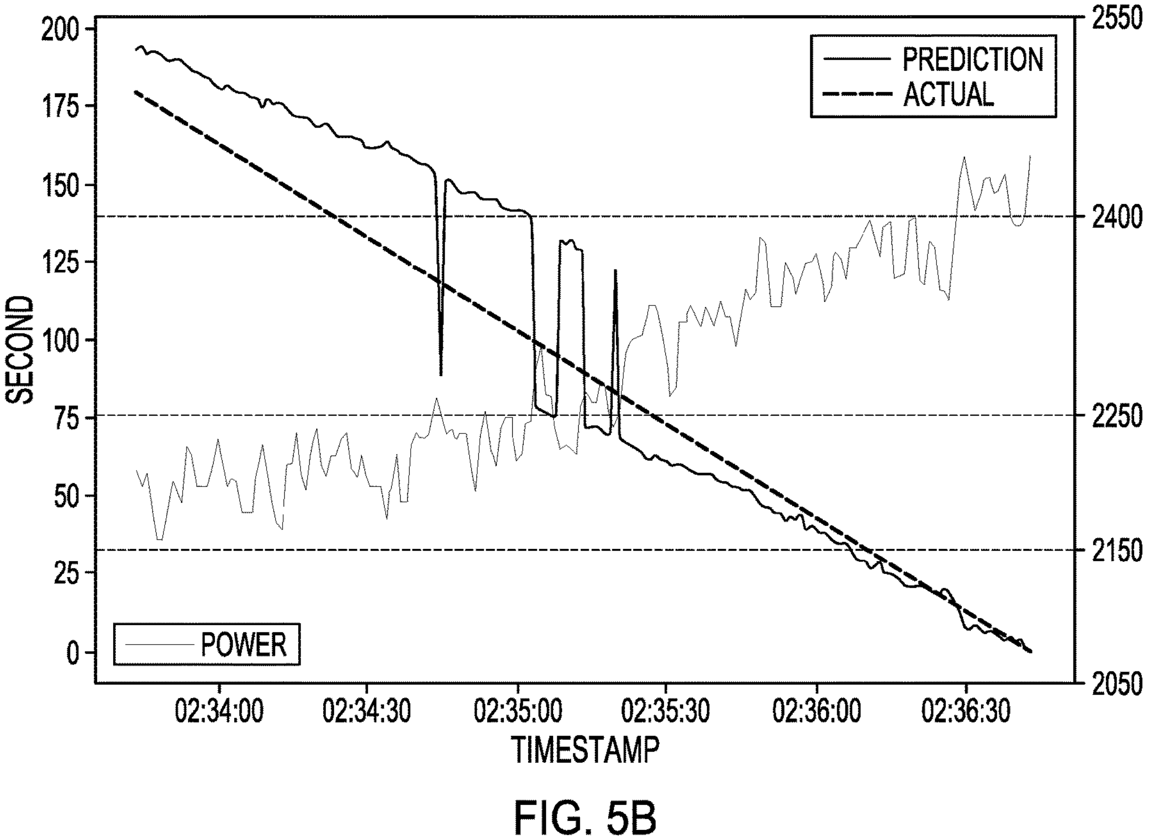

With reference to FIG. 5A and FIG. 5B, some examples seek to improve the accuracy of thermal runtime predictions based on an observation that the closer a component or device gets to a target shutdown temperature, the accuracy of the remaining thermal runtime prediction improves. The graphs depict predicted and actual runtimes to reach a given threshold or shutdown temperature, and power consumption levels for an SOC component operating in a glasses 100 electronic device. In this illustrative example, the measured SOC component was running a lens component in the glasses 100, such as the first or left optical element 126, or the second or right optical element 128 of FIG. 1. These lens components can consume significant power and generate significant heat. In the graphs of FIG. 5A and FIG. 5B, the left Y axis indicates values for predicted and actual runtime in seconds, and the right Y axis indicates SOC power consumption in mW. The X axis depicts time in seconds at selected time stamped intervals, as shown.

The graph in FIG. 5B is a "zoom in" of the right hand side of the graph of FIG. 5A, taken at a point where the predicted remaining runtime is approximately 200 seconds, i.e., close to reaching a threshold or shutdown temperature. In this zoomed in view, it will be noted that as the actual runtime approaches zero seconds, the predicted runtime values corresponding thereto (i.e., example values obtained by applying the predefined function discussed above), are comparatively close (i.e., more accurate) as compared to the more distant predicted runtime values appearing in the top left side of FIG. 5A where the actual runtime remains comparatively plentiful, for example in the region of 300 to 400 seconds. The R2 accuracy value for the larger graph in FIG. 5A is approximately 0.58, whereas the R2 accuracy value for the graph in FIG. 5B (for example, for the last 2 or 3 minutes of remaining runtime) is approximately 0.89 i.e., closer to 1 and therefore more accurate.

Some examples thus utilize or incorporate an aspect in which the thermal runtime prediction becomes more accurate the closer the monitored component or device approaches a threshold or target shutdown temperature. Example method operations in this regard may comprise determining a difference between the predicted remaining runtime and an actual remaining runtime periodically as the electronic device operates; determining that the difference decreases as the predicted remaining runtime decreases over time; wherein the predicted remaining runtime is determined to be more accurate as the predicted remaining runtime approaches zero.

The method may further comprise calculating an accuracy score based on the determined difference between the predicted and actual remaining runtimes; wherein the accuracy score increases as the predicted remaining runtime approaches zero. The method may further comprise outputting the accuracy score with the predicted remaining runtime to indicate the accuracy of the prediction.

In some examples, predicting the remaining runtime further comprises determining a first predicted runtime at a first point in time, wherein the first predicted runtime is a first duration from the first point; determining a second predicted runtime at a second point in time, wherein the second predicted runtime is a second duration from the second point; wherein the second duration is less than the first duration; and wherein an accuracy of the second predicted runtime is higher than an accuracy of the first predicted runtime based on the second duration being less than the first duration.

Some examples may comprise determining a first predicted remaining runtime at a first point in time, wherein the first predicted remaining runtime is a first duration from the first point in time; determining a second predicted remaining runtime at a second point in time, wherein the second predicted remaining runtime is a second duration from the second point in time; wherein the second duration is less than the first duration; adjusting the first predicted remaining runtime based on the second predicted remaining runtime to improve an accuracy of the first predicted remaining runtime.

In some examples, adjusting the first predicted remaining runtime comprises determining an adjustment factor based on a difference between the first duration and the second duration; applying the adjustment factor to the first predicted remaining runtime to generate an adjusted first predicted remaining runtime. In some examples, the adjustment factor is calculated to reduce the difference between the first predicted remaining runtime and an actual remaining runtime at the first point in time. In some examples, the method further comprises continually adjusting previously predicted remaining runtimes based on newly predicted remaining runtimes that are closer to the target shutdown temperature.

As noted above, some examples factor in ambient conditions using sensors associated with the glasses 100. Some examples detect ambient conditions and adjust a thermal runtime prediction or a shutdown temperature threshold based on a detected ambient condition. For example, a method for predicting a thermal runtime of an electronic device may include detecting direct sunlight and adjusting a shutdown temperature threshold.

An example method in this regard may comprise determining a current power consumption of one or more SOCs of the electronic device; selecting a quadratic curve that correlates temperature and time at a power level corresponding to the determined current power consumption, wherein the quadratic curve is selected from a plurality of quadratic curves, each corresponding to different power levels; determining a predicted remaining runtime based on the selected quadratic curve and a shutdown temperature threshold; detecting that the electronic device is in direct sunlight based on sensor data from a light sensor; and in response to detecting direct sunlight, increasing the shutdown temperature threshold to an adjusted higher temperature threshold.

The method may further comprise determining an ambient temperature using the light sensor data; wherein increasing the shutdown temperature threshold is further based on the determined ambient temperature. In some examples, the adjusted higher temperature threshold is calculated by adding an offset value to the shutdown temperature threshold, wherein the offset value is determined based on the ambient temperature. In some examples, the method further comprises detecting that the electronic device is no longer in direct sunlight; and in response, reverting the shutdown temperature threshold back to the original threshold.

Some examples that address or factor in ambient conditions generate different curves under different ambient conditions and select a curve based on both power consumption and ambient condition, rather than adjusting the shutdown temperature threshold based on ambient conditions. This is because the shutdown temperature is usually fixed or preset in a device due to its thermal limit and is not very adjustable, if at all. In some examples, instead of simply generating curves at different power levels, the examples generate curves at different combinations of power level and ambient temperature and when running a prediction they select which curve to use based on the current moment's power consumption and ambient temperature. Other factors examples can take into account when generating and selecting curves can include a screen brightness level, and/or whether a device charger is plugged in, and other factors.

Figure 6:
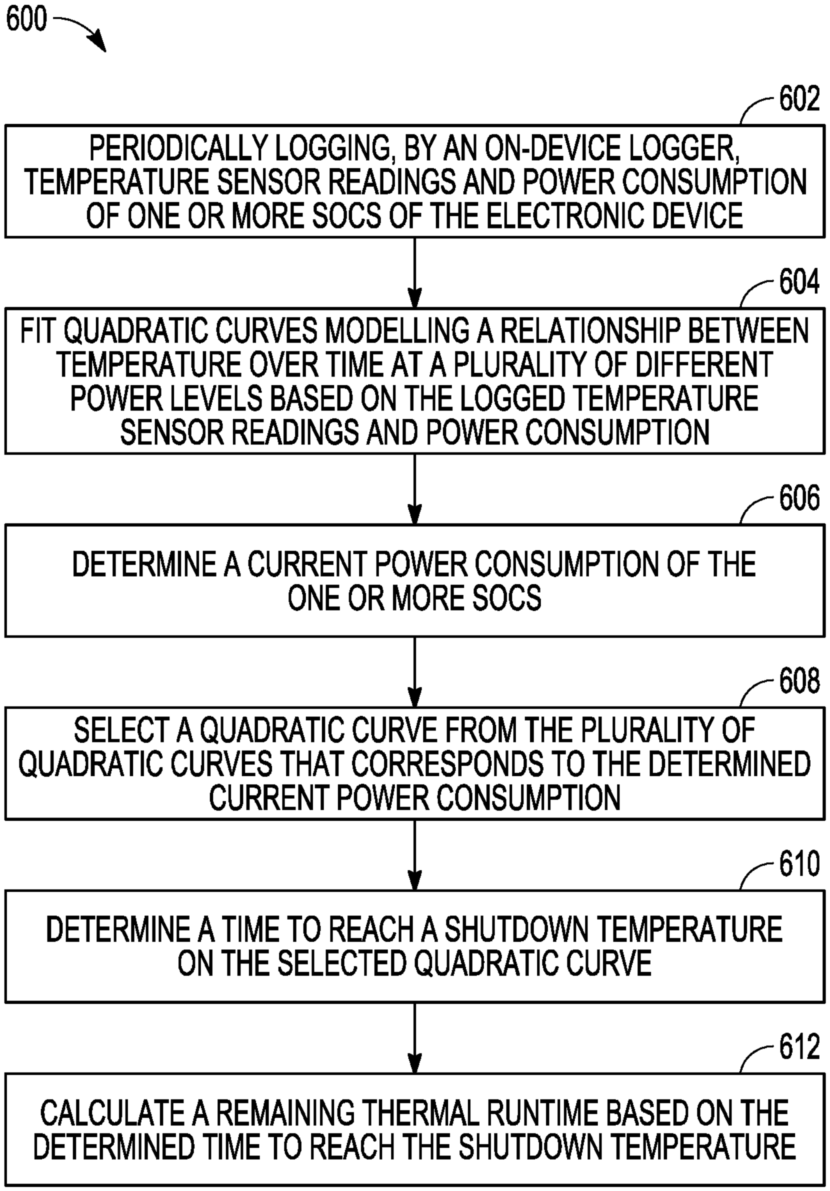
FIG. 6 illustrates a method for predicting remaining thermal runtime of an electronic device, in accordance with one embodiment.

FIG. 6 is a flowchart illustrating a method 600, according to some example embodiments, for predicting remaining thermal runtime of an electronic device. Although the described flow diagram can show operations as a sequential process, many of the operations can be performed in parallel or concurrently. In addition, the order of the operations may be re-arranged, or omitted. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. In some examples, data logging operations occur separately prior to the prediction algorithm or prediction operations. In some examples, data may be logged and collected from artificially stressing the device at different loads, rather than in a thermal runtime processor on the fly. This can make generating data at constant power easier. In some examples, data generation is a separate process.

In operation 602, method 600 periodically logs, by an on-device logger, temperature sensor readings and power consumption of one or more SOCs of the electronic device. In operation 604, method 600 fits quadratic curves modelling a relationship between temperature over time at a plurality of different power levels based on the logged temperature sensor readings and power consumption. In operation 606, method 600 determines a current power consumption of the one or more SOCs. In operation 608, method 600 selects a quadratic curve from the plurality of quadratic curves that corresponds to the determined current power consumption. In operation 610, method 600 determines a time to reach a shutdown temperature on the selected quadratic curve. In operation 612, method 600 calculates a remaining thermal runtime based on the determined time to reach the shutdown temperature.

The method may also include determining a current temperature reading from the on-device logger, and determining a point on the selected quadratic curve that corresponds to the determined current temperature reading, where the remaining thermal runtime is calculated based on the determined point and the time to reach the shutdown temperature. The method may also include fitting the plurality of quadratic curves includes fitting quadratic curves based on stabilized temperature readings within a predefined time period. The method may also include where the predefined time period is 20 minutes. The method may also include where the electronic device includes augmented reality glasses.

The method may also include where the one or more SOCs comprise a first SOC associated with an application processor and a second SOC associated with a graphics processor of the augmented reality glasses. The method may also include periodically logging, by the on-device logger, a first temperature sensor reading for the first SOC and a second temperature sensor reading for the second SOC.

The method may also include where fitting the plurality of quadratic curves includes fitting a first set of quadratic curves based on the first temperature sensor readings at the plurality of different power levels of the first SOC, and fitting a second set of quadratic curves based on the second temperature sensor readings at the plurality of different power levels of the second SOC.

The method may also include where selecting the quadratic curve includes selecting from the first set of quadratic curves based on the determined current power consumption of the first SOC, and selecting from the second set of quadratic curves based on the determined current power consumption of the second SOC. Other technical features may be readily apparent to one skilled in the art from the following figures, descriptions, and claims.

Figure 7:
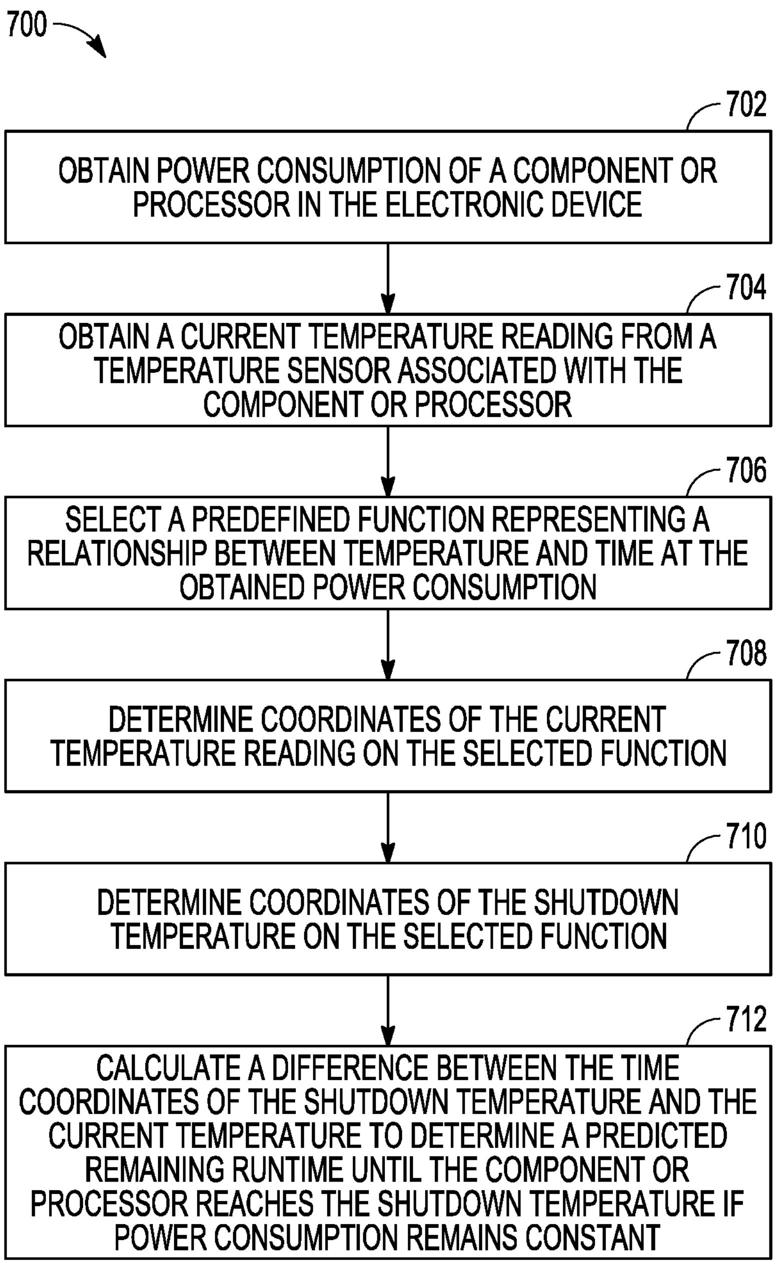
FIG. 7 illustrates a method for predicting a remaining runtime until a shutdown temperature is reached in an electronic device, in accordance with one embodiment.

FIG. 7 is a flowchart illustrating a method 700, according to some example embodiments, for predicting a remaining runtime until a shutdown temperature is reached in an electronic device. Although the described flow diagram can show operations as a sequential process, many of the operations can be performed in parallel or concurrently. In addition, the order of the operations may be re-arranged, or omitted. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. In some examples, data logging operations occur separately prior to the prediction algorithm or prediction operations. In some examples, data may be logged and collected from artificially stressing the device at different loads, rather than in a thermal runtime processor on the fly. This can make generating data at constant power easier. In some examples, data generation is a separate process.

In operation 702, method 700 obtains power consumption of a component or processor in the electronic device. In operation 704, method 700 obtains a current temperature reading from a temperature sensor associated with the component or processor. In operation 706, method 700 selects a predefined function representing a relationship between temperature and time at the obtained power consumption. In operation 708, method 700 determines coordinates of the current temperature reading on the selected function. In operation 710, method 700 determines coordinates of the shutdown temperature on the selected function. In operation 712, method 700 calculates a difference between the time coordinates of the shutdown temperature and the current temperature to determine a predicted remaining runtime until the component or processor reaches the shutdown temperature if power consumption remains constant.

EXAMPLES

Thus, some embodiments may include one or more of the following examples.

1. A method for predicting remaining thermal runtime of an electronic device, the method comprising: periodically logging, by an on-device logger, temperature sensor readings and power consumption of one or more SOCs of the electronic device; fitting a plurality of quadratic curves modelling a relationship between temperature over time at a respective plurality of different power levels based on the logged temperature sensor readings and power consumption; determining a current power consumption of the one or more SOCs; selecting a quadratic curve from the plurality of quadratic curves that corresponds to the determined current power consumption; determining a time to reach a shutdown temperature on the selected quadratic curve; and calculating a remaining thermal runtime based on the determined time to reach the shutdown temperature.
2. The method of example 1, further comprising: determining a current temperature reading from the on-device logger; and determining a point on the selected quadratic curve that corresponds to the determined current temperature reading, wherein the remaining thermal runtime is calculated based on the determined point and the time to reach the shutdown temperature.
3. The method of example 1 or 2, wherein fitting the plurality of quadratic curves comprises fitting quadratic curves based on stabilized temperature readings within a predefined time period.
4. The method of example 3, wherein the predefined time period is approximately 20 minutes.
5. The method of any one of examples 1-4, wherein the electronic device comprises augmented reality glasses.
6. The method of any one of examples 1-5, wherein the one or more SOCs comprise a first SOC associated with an application processor and a second SOC associated with a graphics processor of the augmented reality glasses.
7. The method of any one of examples 1-6, further comprising: periodically logging, by the on-device logger, a first temperature sensor reading for the first SOC and a second temperature sensor reading for the second SOC.
8. The method of any one of examples 1-7, wherein fitting the plurality of quadratic curves comprises: fitting a first set of quadratic curves based on the first temperature sensor readings at the plurality of different power levels of the first SOC; and fitting a second set of quadratic curves based on the second temperature sensor readings at the plurality of different power levels of the second SOC.
9. The method of any one of examples 1-8, wherein selecting the quadratic curve comprises: selecting from the first set of quadratic curves based on the determined current power consumption of the first SOC; and selecting from the second set of quadratic curves based on the determined current power consumption of the second SOC.
10. An electronic device comprising: a processor; and a memory storing instructions that, when executed by the processor, configure the electronic device to: periodically log, by an on-device logger, temperature sensor readings and power consumption of one or more SOCs of the electronic device; fit quadratic curves modelling a relationship between temperature over time at a plurality of different power levels based on the logged temperature sensor readings and power consumption; determine a current power consumption of the one or more SOCs; select a quadratic curve from the plurality of quadratic curves that corresponds to the determined current power consumption; determine a time to reach a shutdown temperature on the selected quadratic curve; and calculate a remaining thermal runtime based on the determined time to reach the shutdown temperature.
11. The electronic device of example 10, wherein the instructions further configure the device to: determine a current temperature reading from the on-device logger; and determine a point on the selected quadratic curve that corresponds to the determined current temperature reading, wherein the remaining thermal runtime is calculated based on the determined point and the time to reach the shutdown temperature.
12. The electronic device of example 10 or 11, wherein fit the plurality of quadratic curves comprises fitting quadratic curves based on stabilized temperature readings within a predefined time period.
13. The electronic device of example 12, wherein the predefined time period is approximately 20 minutes.
14. The electronic device of any one of examples 10-13, wherein the electronic device comprises augmented reality glasses.
15. The electronic device of any one of examples 10-14, wherein the one or more SOCs comprise a first SOC associated with an application processor and a second SOC associated with a graphics processor of the augmented reality glasses.
16. The electronic device of any one of examples 10-15, wherein the instructions further configure the device to: periodically log, by the on-device logger, a first temperature sensor reading for the first SOC and a second temperature sensor reading for the second SOC.
17. The electronic device of any one of examples 10-16, wherein fitting the plurality of quadratic curves comprises: fit a first set of quadratic curves based on the first temperature sensor readings at the plurality of different power levels of the first SOC; and fit a second set of quadratic curves based on the second temperature sensor readings at the plurality of different power levels of the second SOC.
18. The electronic device of any one of examples 10-17, wherein selecting the quadratic curve comprises: select from the first set of quadratic curves based on the determined current power consumption of the first SOC; and select from the second set of quadratic curves based on the determined current power consumption of the second SOC.
19. A non-transitory computer-readable storage medium, the computer-readable storage medium including instructions that when executed by a computer, cause the computer to: periodically log, by an on-device logger, temperature sensor readings and power consumption of one or more SOCs of an electronic device; fit quadratic curves modelling a relationship between temperature over time at a plurality of different power levels based on the logged temperature sensor readings and power consumption; determine a current power consumption of the one or more SOCs; select a quadratic curve from the plurality of quadratic curves that corresponds to the determined current power consumption; determine a time to reach a shutdown temperature on the selected quadratic curve; and calculate a remaining thermal runtime based on the determined time to reach the shutdown temperature.

20. The computer-readable storage medium of example 19, wherein the instructions further configure the computer to: determine a current temperature reading from the on-device logger; and determine a point on the selected quadratic curve that corresponds to the determined current temperature reading, wherein the remaining thermal runtime is calculated based on the determined point and the time to reach the shutdown temperature.

21. A method for predicting a remaining runtime until a shutdown temperature is reached in an electronic device, the method including: obtaining power consumption of a component or processor in the electronic device; obtaining a current temperature reading from a temperature sensor associated with the component or processor; selecting a predefined function representing a relationship between temperature and time at the obtained power consumption; determining coordinates of the current temperature reading on the selected function; determining coordinates of the shutdown temperature on the selected function; and calculating a difference between the time coordinates of the shutdown temperature and the current temperature to determine a predicted remaining runtime until the component or processor reaches the shutdown temperature if power consumption remains constant.

Although embodiments have been described with reference to specific example embodiments, it will be evident that various modifications and changes may be made to these embodiments without departing from the broader scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "example" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for predicting remaining thermal runtime of an electronic device, the method comprising:

periodically logging, by an on-device logger, temperature sensor readings and power consumption of one or more SOCs of the electronic device;

fitting a plurality of quadratic curves modelling a relationship between temperature over time at a respective plurality of different power levels based on the logged temperature sensor readings and power consumption;

determining a current power consumption of the one or more SOCs;

selecting a quadratic curve from the plurality of quadratic curves that corresponds to the determined current power consumption;

determining a time to reach a shutdown temperature on the selected quadratic curve; and calculating a remaining thermal runtime based on the determined time to reach the shutdown temperature.

2. The method of claim 1, further comprising:

determining a current temperature reading from the on-device logger; and determining a point on the selected quadratic curve that corresponds to the determined current temperature reading, wherein the remaining thermal runtime is calculated based on the determined point and the time to reach the shutdown temperature.

3. The method of claim 1, wherein fitting the plurality of quadratic curves comprises fitting quadratic curves based on stabilized temperature readings within a predefined time period.

4. The method of claim 3, wherein the predefined time period is approximately 20 minutes.

5. The method of claim 1, wherein the electronic device comprises augmented reality glasses.

6. The method of claim 5, wherein the one or more SOCs comprise a first SOC associated with an application processor and a second SOC associated with a graphics processor of the augmented reality glasses.

7. The method of claim 6, further comprising:

periodically logging, by the on-device logger, a first temperature sensor reading for the first SOC and a second temperature sensor reading for the second SOC.

8. The method of claim 7, wherein fitting the plurality of quadratic curves comprises:

fitting a first set of quadratic curves based on the first temperature sensor readings at the plurality of different power levels of the first SOC; and fitting a second set of quadratic curves based on the second temperature sensor readings at the plurality of different power levels of the second SOC.

9. The method of claim 8, wherein selecting the quadratic curve comprises:

selecting from the first set of quadratic curves based on the determined current power consumption of the first SOC; and selecting from the second set of quadratic curves based on the determined current power consumption of the second SOC.

10. An electronic device comprising:

a processor; and a memory storing instructions that, when executed by the processor, configure the electronic device to:

periodically log, by an on-device logger, temperature sensor readings and power consumption of one or more SOCs of the electronic device;

fit quadratic curves modelling a relationship between temperature over time at a plurality of different power levels based on the logged temperature sensor readings and power consumption;

determine a current power consumption of the one or more SOCs;

select a quadratic curve from the plurality of quadratic curves that corresponds to the determined current power consumption;

determine a time to reach a shutdown temperature on the selected quadratic curve; and calculate a remaining thermal runtime based on the determined time to reach the shutdown temperature.

11. The electronic device of claim 10, wherein the instructions further configure the device to:

determine a current temperature reading from the on-device logger; and determine a point on the selected quadratic curve that corresponds to the determined current temperature reading, wherein the remaining thermal runtime is calculated based on the determined point and the time to reach the shutdown temperature.

12. The electronic device of claim 10, wherein fit the plurality of quadratic curves comprises fitting quadratic curves based on stabilized temperature readings within a predefined time period.

13. The electronic device of claim 12, wherein the predefined time period is approximately 20 minutes.

14. The electronic device of claim 10, wherein the electronic device comprises augmented reality glasses.

15. The electronic device of claim 14, wherein the one or more SOCs comprise a first SOC associated with an application processor and a second SOC associated with a graphics processor of the augmented reality glasses.

16. The electronic device of claim 15, wherein the instructions further configure the device to:

periodically log, by the on-device logger, a first temperature sensor reading for the first SOC and a second temperature sensor reading for the second SOC.

17. The electronic device of claim 16, wherein fitting the plurality of quadratic curves comprises:

fit a first set of quadratic curves based on the first temperature sensor readings at the plurality of different power levels of the first SOC; and fit a second set of quadratic curves based on the second temperature sensor readings at the plurality of different power levels of the second SOC.

18. The electronic device of claim 17, wherein selecting the quadratic curve comprises:

select from the first set of quadratic curves based on the determined current power consumption of the first SOC; and select from the second set of quadratic curves based on the determined current power consumption of the second SOC.

19. A non-transitory computer-readable storage medium, the computer-readable storage medium including instructions that when executed by a computer, cause the computer to:

periodically log, by an on-device logger, temperature sensor readings and power consumption of one or more SOCs of an electronic device;

fit quadratic curves modelling a relationship between temperature over time at a plurality of different power levels based on the logged temperature sensor readings and power consumption;

determine a current power consumption of the one or more SOCs;

select a quadratic curve from the plurality of quadratic curves that corresponds to the determined current power consumption;

determine a time to reach a shutdown temperature on the selected quadratic curve; and calculate a remaining thermal runtime based on the determined time to reach the shutdown temperature.

20. The computer-readable storage medium of claim 19, wherein the instructions further configure the computer to:

determine a current temperature reading from the on-device logger; and determine a point on the selected quadratic curve that corresponds to the determined current temperature reading, wherein the remaining thermal runtime is calculated based on the determined point and the time to reach the shutdown temperature.

21. A method for predicting a remaining runtime until a shutdown temperature is reached in an electronic device, the method including:

obtaining power consumption of a component or processor in the electronic device;

obtaining a current temperature reading from a temperature sensor associated with the component or processor;

selecting a predefined function representing a relationship between temperature and time at the obtained power consumption;

determining coordinates of the current temperature reading on the selected function;

determining coordinates of the shutdown temperature on the selected function; and calculating a difference between the time coordinates of the shutdown temperature and the current temperature to determine a predicted remaining runtime until the component or processor reaches the shutdown temperature if power consumption remains constant.

* * * * *